United States Patent
Kamimura

(10) Patent No.: US 12,293,346 B2
(45) Date of Patent: May 6, 2025

(54) INFORMATION PROCESSING APPARATUS, INFORMATION PROCESSING METHOD, AND STORAGE MEDIUM

(71) Applicant: NEC Corporation, Tokyo (JP)

(72) Inventor: Junichi Kamimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/675,320

(22) Filed: May 28, 2024

(65) Prior Publication Data

US 2024/0311793 A1  Sep. 19, 2024

Related U.S. Application Data

(63) Continuation of application No. 17/635,763, filed as application No. PCT/JP2021/010762 on Mar. 17, 2021, now Pat. No. 12,039,510.

(51) Int. Cl.
G06Q 20/20 (2012.01)

(52) U.S. Cl.
CPC ................................. *G06Q 20/208* (2013.01)

(58) Field of Classification Search
CPC .... G06Q 20/208; G06Q 10/101; G06Q 20/18; G06Q 20/20; G06Q 20/401; G06Q 20/40145; G06Q 20/42; G07G 1/0054; G07G 1/12; G07G 3/00; G07G 1/0036
See application file for complete search history.

(56) References Cited

U.S. PATENT DOCUMENTS

| | | | | |
|---|---|---|---|---|
| 10,360,599 | B2 * | 7/2019 | Costello | G06Q 30/01 |
| 10,929,661 | B1 * | 2/2021 | Manyam | G06V 20/52 |
| 2003/0167205 | A1 * | 9/2003 | Maruyama | G06Q 30/0217 |
| | | | | 705/26.1 |
| 2005/0144049 | A1 * | 6/2005 | Kuzunuki | H04L 67/04 |
| | | | | 705/6 |
| 2013/0108157 | A1 * | 5/2013 | Ptucha | G06T 11/60 |
| | | | | 382/173 |
| 2015/0213429 | A1 * | 7/2015 | Kanamori | G06Q 20/208 |
| | | | | 705/23 |
| 2015/0213430 | A1 * | 7/2015 | Nakane | G07G 1/0063 |
| | | | | 705/23 |
| 2015/0379494 | A1 * | 12/2015 | Hiroi | G06V 10/25 |
| | | | | 705/16 |

(Continued)

FOREIGN PATENT DOCUMENTS

| | | | |
|---|---|---|---|
| JP | 2015-099504 A | 5/2015 | |
| JP | 2017-130061 A | 7/2017 | |

(Continued)

OTHER PUBLICATIONS

International Search Report for PCT Application No. PCT/JP2021/010762, mailed on Jun. 15, 2021.

(Continued)

*Primary Examiner* — Michael Jared Walker
(74) *Attorney, Agent, or Firm* — Sughrue Mion, PLLC

(57) ABSTRACT

In an information processing apparatus, the person identifying means identifies a person who has entered a facility. The group estimation means estimates a group including a plurality of persons. The group presentation means presents an estimation result of the group to the person. The group setting means sets the group based on a response to the estimation result of the group.

13 Claims, 14 Drawing Sheets

(56) References Cited

U.S. PATENT DOCUMENTS

| | | | |
|---|---|---|---|
| 2017/0345081 A1* | 11/2017 | Itasaki | H04W 4/02 |
| 2018/0181940 A1* | 6/2018 | Fujiwara | B07G 1/145 |
| 2019/0066169 A1 | 2/2019 | Costello | |
| 2019/0122231 A1* | 4/2019 | Yoshimura | G06V 40/16 |
| 2019/0259015 A1* | 8/2019 | Jacquet | G07F 17/0064 |
| 2019/0347635 A1* | 11/2019 | Siedlecki | H04W 4/35 |
| 2019/0354777 A1 | 11/2019 | Beck et al. | |
| 2020/0134701 A1 | 4/2020 | Zucker et al. | |
| 2020/0265394 A1* | 8/2020 | Kubo | G06Q 20/065 |
| 2021/0090057 A1* | 3/2021 | Takeno | G08B 13/19608 |
| 2021/0158053 A1* | 5/2021 | Zucker | G06K 7/1413 |
| 2021/0272174 A1* | 9/2021 | Fujisawa | G06K 7/10297 |
| 2021/0326964 A1* | 10/2021 | Isaacson | G06Q 30/0633 |
| 2022/0101296 A1* | 3/2022 | Nakamura | B65G 1/137 |
| 2022/0139087 A1* | 5/2022 | Nakamura | G06Q 10/04 348/159 |
| 2022/0270105 A1* | 8/2022 | Kawase | G06F 21/30 |
| 2022/0292934 A1* | 9/2022 | Shiraishi | G06Q 20/208 |
| 2022/0343673 A1* | 10/2022 | Senda | G06V 20/52 |
| 2023/0102033 A1* | 3/2023 | Tsuda | G06Q 30/06 705/39 |
| 2023/0169506 A1* | 6/2023 | Tahara | G06Q 20/206 705/44 |

FOREIGN PATENT DOCUMENTS

| | | |
|---|---|---|
| JP | 2020-030647 A | 2/2020 |
| JP | 2020-091622 A | 6/2020 |
| JP | 2020-166638 A | 10/2020 |
| JP | 2021-026494 A | 2/2021 |
| WO | 2018/180588 A | 10/2018 |
| WO | 2020/179480 A1 | 9/2020 |

OTHER PUBLICATIONS

Extended European Search Report for EP Application No. 21931504.1, dated on Jan. 3, 2024.

* cited by examiner

FIG. 3

35: REGISTRANT INFORMATION DB

| REGISTRATION ID | NAME | CONTACT INFORMATION | PAYMENT INFORMATION | PERSONAL FEATURE INFORMATION | ATTRIBUTE INFORMATION |
|---|---|---|---|---|---|
| M001 | TARO YAMADA | CONTACT INFORMATION A | PAYMENT INFORMATION A | PERSONAL FEATURE INFORMATION A | FAMILY WITH M002 |
| M002 | HANAKO YAMADA | CONTACT INFORMATION B | PAYMENT INFORMATION B | PERSONAL FEATURE INFORMATION B | FAMILY WITH M001 |
| ⋮ | ⋮ | ⋮ | ⋮ | ⋮ | ⋮ |

FIG. 4

36: GOODS INFORMATION DB

| GOODS ID | GOODS NAME | PRICE | GOODS FEATURE INFORMATION |
|---|---|---|---|
| P001 | RETORT CURRY | ¥150 | GOODS FEATURE INFORMATION C |
| P002 | JUICE | ¥85 | GOODS FEATURE INFORMATION D |
| P003 | BEER | ¥180 | GOODS FEATURE INFORMATION E |
| ⋮ | ⋮ | ⋮ | ⋮ |

FIG. 5

37: STORE-VISITOR INFORMATION DB

| REGISTRATION ID (REGISTERED) | TEMPORARY ID (NOT REGISTERED) | NAME | TYPE | PERSON IMAGE INFORMATION | LEAVING FLAG | GROUP ID |
|---|---|---|---|---|---|---|
| M001 | — | TARO YAMADA | PAYER | FACE IMAGE DATA A | n | G001 |
| M002 | — | HANAKO YAMADA | COMPANION | FACE IMAGE DATA B | n | |
| — | T015 | — | COMPANION | FACE IMAGE DATA C | n | |
| — | T016 | — | UNKNOWN | FACE IMAGE DATA D | n | — |
| ⋮ | ⋮ | ⋮ | ⋮ | ⋮ | ⋮ | ⋮ |

FIG. 6

38: PURCHASING GOODS LIST DB

| PURCHASER | | PURCHASING GOODS ID | GOODS NAME | PRICE | NUMBER | SUBTOTAL | GROUP ID | TOTAL AMOUNT |
|---|---|---|---|---|---|---|---|---|
| REGISTRA-TION ID | TEMPORARY ID | | | | | | | |
| M001 | — | P003 | BEER | ¥180 | 2 | ¥510 | G001 | ¥695 |
| M002 | — | P001 | RETORT CURRY | ¥150 | 1 | | | |
| — | T015 | P002 | JUICE | ¥85 | 1 | ¥185 | | |
| — | T015 | P010 | CREAM PUFF | ¥100 | 1 | | | |
| ⋮ | ⋮ | ⋮ | ⋮ | ⋮ | ⋮ | ⋮ | ⋮ | ⋮ |

FIG. 9A

<PURCHASING GOODS LIST SCREEN>

| PAYER | | | COMPANION A | | | COMPANION B | | |
|---|---|---|---|---|---|---|---|---|
| GOODS | NUM-BER | PRICE | GOODS | NUM-BER | PRICE | GOODS | NUM-BER | PRICE |
| BEER | 2 | ¥180 | RETORT CURRY | 1 | ¥150 | JUICE | 1 | ¥85 |
| | | | | | | CREAM PUFF | 1 | ¥100 |
| SUBTOTAL | | ¥180 | SUBTOTAL | | ¥150 | SUBTOTAL | | ¥285 |
| TOTAL AMOUNT | | | | ¥695 | | | | |

APPROVE — 72

FIG. 9B

<PURCHASING GOODS LIST SCREEN>

| PAYER | | | COMPANION A | | | COMPANION B | | |
|---|---|---|---|---|---|---|---|---|
| GOODS | NUM-BER | PRICE | GOODS | NUM-BER | PRICE | GOODS | NUM-BER | PRICE |
| BEER | 2 | ¥180 | RETORT CURRY | 1 | ¥150 | JUICE | 1 | ¥85 |
| | | | | | | CREAM PUFF | 1 | ¥100 |
| SUBTOTAL | | ¥180 | SUBTOTAL | | ¥150 | SUBTOTAL | | ¥285 |
| TOTAL AMOUNT | | | | ¥695 | | | | |

APPROVE — 72

<GOODS ASSOCIATION PROCESSING>

<GROUP SETTING PROCESSING>

INFORMATION PROCESSING APPARATUS, INFORMATION PROCESSING METHOD, AND STORAGE MEDIUM

This application is a Continuation of U.S. application Ser. No. 17/635,763 filed on Feb. 16, 2022, which is a National Stage Entry of PCT/JP2021/010762 filed on Mar. 17, 2021, the contents of all of which are incorporated herein by reference, in their entirety.

TECHNICAL FIELD

This disclosure relates to a technical field of a facility management system that automates facility operation or saves labor for facility operation.

BACKGROUND ART

In recent years, unmanned or labor-saving AI (Artificial Intelligence) stores have been introduced in supermarkets and convenience stores. Due to the influence of the recent spread of infectious disease, the demand for unmanned or labor-saving AI stores is expected to increase further in the future.

As a technique for automating or labor-saving the store operation, Patent Documents 1 to 3 are known. Patent Document 1 discloses an article estimation apparatus which automatically discriminates goods taken out from a shelf by a person, and associates a person with those goods. Also, Patent Document 2 discloses a group estimation apparatus for estimating a group including at least one objective person out of a plurality of objective persons, based on the line-of-sight information or the like. Further, Patent Document 3 discloses a shopping management apparatus for net shopping, in which shopping is performed by a group of users, and a designated one user pays money for the group of users collectively.

PRECEDING TECHNICAL REFERENCES

Patent Documents

Patent Document 1: International Publication WO2020/179480
Patent Document 2: Japanese Patent Application Laid-open under No. 2020-091622
Patent Document 3: Japanese Patent Application Laid-open under No 2015-099504

SUMMARY

Problem to be Solved

This disclosure aims to improve the techniques disclosed in the above preceding technical references.

Means for Solving the Problem

According to one aspect of the disclosure, there is provided an information processing apparatus comprising:
 a person identifying means configured to identify a person who has entered a facility;
 a group estimation means configured to estimate a group including a plurality of persons;
 a group presentation means configured to present an estimation result of the group to the person; and
 a group setting means configured to set the group based on a response to the estimation result of the group.

According to another aspect of the disclosure, there is provided an information processing method comprising:
 identifying a person who has entered a facility;
 estimating a group including a plurality of persons;
 presenting an estimation result of the group to the person; and
 setting the group based on a response to the estimation result of the group.

According to still another aspect of the disclosure, there is provided a recording medium recording a program that causes a computer to execute processing comprising:
 identifying a person who has entered a facility;
 estimating a group including a plurality of persons;
 presenting an estimation result of the group to the person; and
 setting the group based on a response to the estimation result of the group.

BRIEF DESCRIPTION OF THE DRAWINGS

FIG. 3 is an example of data structure of a registrant information DB.
FIG. 4 is an example of data structure of a goods information DB.
FIG. 5 is an example of data configuration of a store-visitor information DB.
FIG. 6 is an example of data structure of a purchasing goods list DB.
FIGS. 9A and 9B are display examples of a purchasing goods list screen.

EXAMPLE EMBODIMENTS

First Example Embodiment

Hereinafter, a description will be given of a first example embodiment of this disclosure with reference to the accompanied drawings.

[Configuration of Facility Management System]

Figure 1:
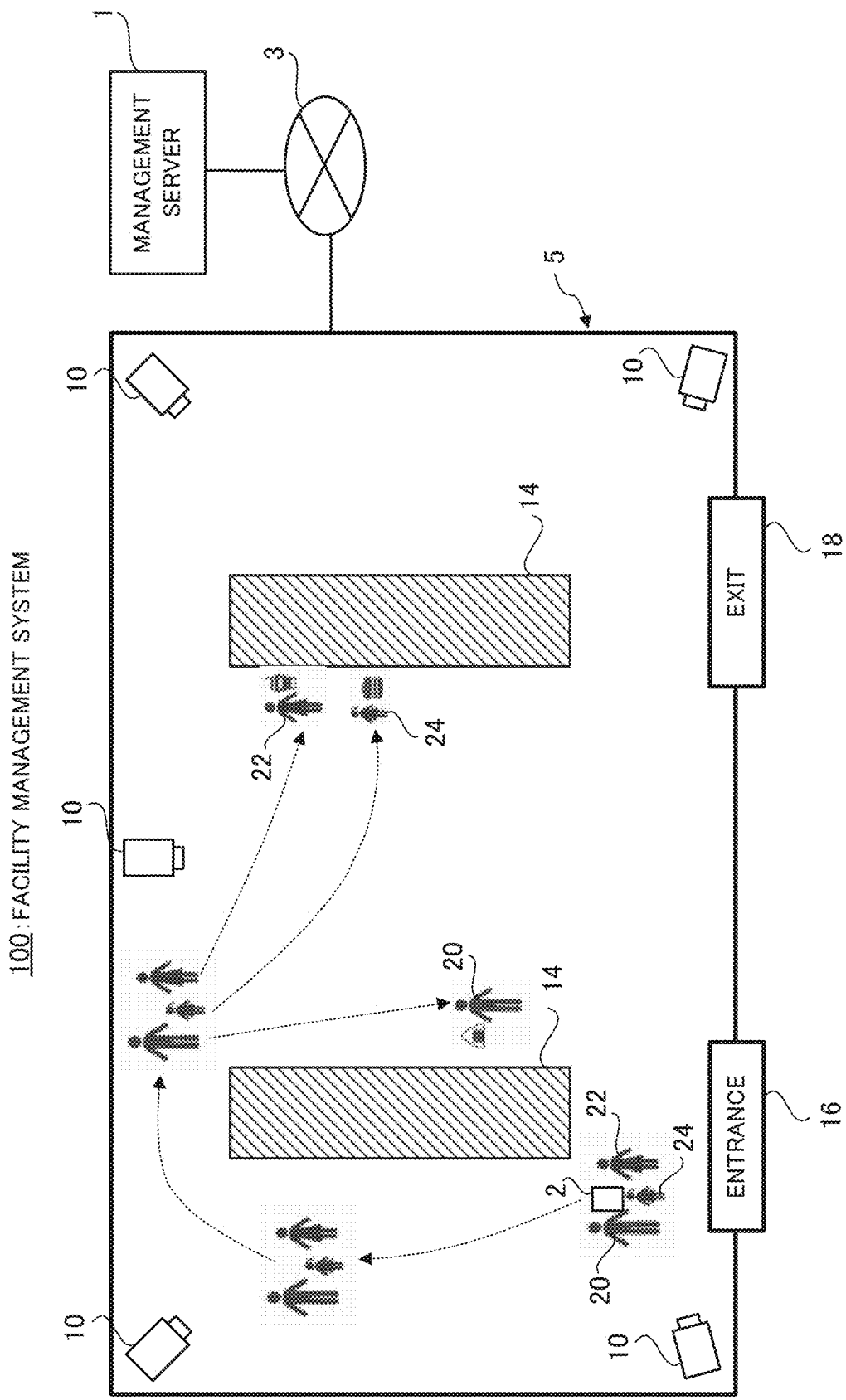
FIG. 1 illustrates a configuration of a facility management system according to a first example embodiment.

FIG. 1 shows a configuration of a facility management system 100 according to the present example embodiment. The facility management system 100 is a system for managing the facility. The facility may be a store, an airport, a station, an amusement park, an event site, a company or the like. In this example embodiment, a specific example will be described in which a store is used as an example of a facility.

The facility management system 100 mainly includes a management server 1, a portable terminal 2 used by a user, a plurality of cameras 10 provided inside or outside of the store 5, store shelves 14, an entrance 16, and an exit 18. For the entrance 16 and the exit 18, the presence or absence of a gate is optional.

The management server 1 and the cameras 10 are connected by at least one of a wired connection or a wireless connection through an arbitrary network 3 such as a local area network or the Internet. Incidentally, the management server 1 and the cameras 10 may be directly connected. Further, the management server 1 and the portable terminal 2 are connected to communicate via the arbitrary network 3 such as the Internet.

The facility management system 100 first estimates a group and a payer for the users who entered the store 5, and presents the estimation result to the users. Then, the facility management system 100 sets the group and the payer based on the response of the user to the estimation result. Further, the facility management system 100 collectively performs the payment for the total amount of money of all the goods taken by the users belonging to the group on the basis of the payment information of the payer at a time. Here, a group is a party of users who shop together, such as a family or friends. Also, a payer is a person who pays money for all the goods taken by the users belonging to the group.

The user enters the store alone or with other users, takes goods to be purchased (hereinafter also referred to as "purchasing goods") from among the goods displayed on the store shelves 14, and puts them in the cart. Specifically, the user 20 shown in FIG. 1 is a man in his 30s, and enters the store with the user 22 who is his wife and the user 24 who is his daughter. The cart is a container used by a user doing shopping puts the purchasing goods in and moves in the store 5. A plurality of users belonging to the same group share one cart. In this disclosure, the user 20, the user 22, and the user 24 are a family and belong to one group. Also, the user who pays the price of the purchasing goods is called "the payer", and the user other than the payer and belonging to the group is called "the companion". In the example of FIG. 1, the user 20 is a payer, and the users 22 and 24 are companions.

The camera 10 is an imaging device. The camera 10 includes an image sensor such as a CCD (Charge Coupled Device) sensor, a CMOS (Complementary Metal Oxid Semiconductor) sensor, or the like.

The camera 10 is provided at multiple positions inside or outside the store, for example, at a place near the entrance 16 of the store 5, a place where goods are displayed in the store 5 (hereinafter also referred to as a "shop"), a place near the exit 18 of the store 5, a parking lot of the store 5, and the like. The camera 10 provided near the entrance 16 images the users entering the store. The camera 10 provided in the shop images the users and goods in the shop. The camera 10 provided near the exit 18 images the users leaving the store. The camera 10 provided in the parking lot images the vehicle in which the user is riding, the passengers, and the riding position of the user. The store 5 is provided with a number of cameras 10 with the arrangement that enables imaging the users and goods present anywhere in the store 5. The camera 10 transmits the image data including images acquired by imaging to the management server 1.

The management server 1 identifies the user who enters the store, identifies the purchasing goods taken by each user, estimates the group, and estimates the payer, based on the image data acquired from the camera 10. Then, the management server 1 presents the estimation result to the user, and sets the group and the payer based on the response of the user to the estimation result. Further, the management server 1 collectively performs the payment for the total amount of all the purchasing goods taken by the users belonging to the group at a time, on the basis of the payment information of the payer.

The management server 1 may be implemented on a single computer or a plurality of computers. The management server 1 may be installed in the store 5. The management server 1 may be implemented on a cloud that is a collection of computer resources.

The portable terminal 2 is a portable terminal device such as a smartphone or a tablet used by a user who shops at the store 5. The portable terminal 2 has a function of receiving the estimation result of the group and the payer from the management server 1 and displaying it as a group confirmation screen and the like. Further, the mobile terminal 2 has a function of transmitting the addition or exclusion of the companion, the change of the payer, and the like inputted by the operation of the user on the group confirmation screen to the management server 1 as a response of the user to the estimation result. It is noted that only the portable terminal 2 used by the user 20 is shown in FIG. 1 for convenience of explanation, but other users may have the portable terminal 2 in the store 5.

[Configuration]

Next, each configuration of the management server 1 and the portable terminal 2 will be described with reference to FIGS. 2 to 10.

(Management Server)

Figure 2:
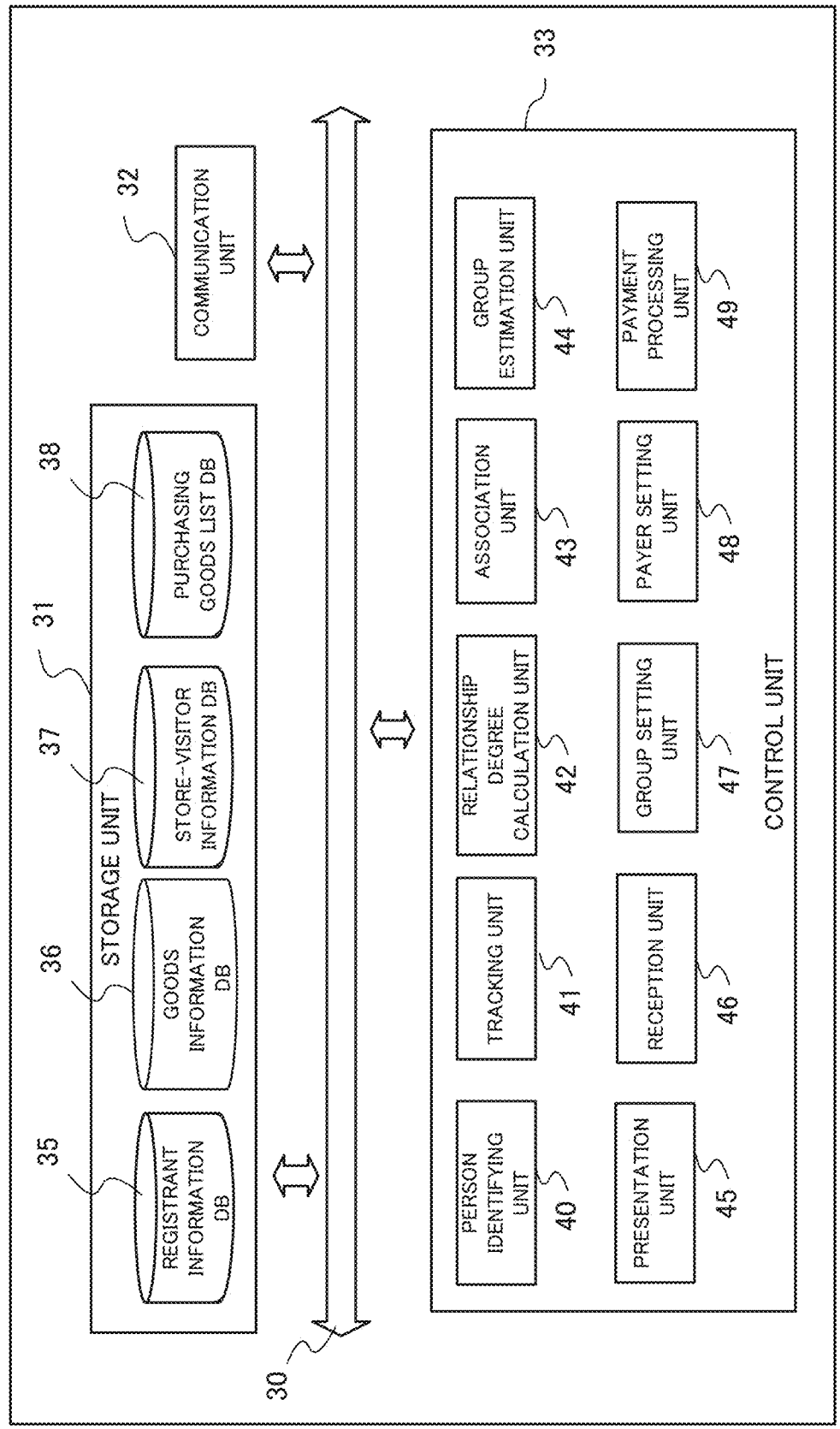
FIG. 2 illustrates a schematic configuration of a management server.

FIG. 2 shows a schematic configuration of the management server 1. The management server 1 mainly includes a storage unit 31, a communication unit 32 for performing data communication, and a control unit 33. These elements are interconnected by a bus line 30.

The storage unit 31 is configured by a memory such as a hard disk or a flash memory. The storage unit 31 stores a program executed by the control unit 33 and information necessary for the control unit 33 to execute a predetermined processing by executing the program. In this example embodiment, the storage unit 31 includes a registrant information DB (Database) 35, a goods information DB 36, a store-visitor information DB 37, and a purchasing goods list DB 38. Incidentally, the storage unit 31 may store information relating to various store managements other than the registrant information DB 35, the goods information DB 36, the store-visitor information DB 37, and the purchasing goods list DB 38.

The registrant information DB 35 is a database of information relating to users (hereinafter also referred to as "registrants") who have made member registration of the store 5. FIG. 3 is an example of a data structure of a registrant information DB 35. As shown, the registrant information DB 35 stores registrant information such as a registration ID, a name, a contact information, a payment information, a personal feature information, and an attribute information. Incidentally, the member registration of the store 5 is performed by arbitrary methods.

The registration ID is an identification information for identifying the registrant. The name is the name of the registrant. The contact information is information necessary for communicating with the registrant, for example, the mail address of the portable terminal 2 used by the registrant. The payment information is information used for the payment processing of the purchasing goods, such as a credit card number or a bank account number of the registrant. The personal feature information is information for determining whether or not the user is a registrant using the image data of the user who entered the store, and for identifying who he/she is if the user is the registrant. The personal feature information may be the image data itself of the area including the face of the user, or may be the feature amount calculated from the image data of the area including the face of the user. The attribute information is information indicating the relationship between the registrants such as "family" or "friend". For example, if the registrant of the registration ID "M001" and the registrant of the registration ID "M002" are a married couple, information such as "family of M002" is stored as the attribute information of the registration ID "M001".

The goods information DB 36 is a database of information about goods dealt in the store 5. FIG. 4 is an example of data configuration of the goods information DB 36. As illustrated, the goods information DB 36 stores goods information such as a goods ID, a goods name, a price, and a goods feature information. The goods ID is identification information for identifying the goods, which may be a JAN (Japanese Article Number) code or the like. The goods name is the name of the goods, and the price is the price of the goods. The goods feature information is information for identifying the purchasing goods taken by the user, using the image data of the area including the goods. The goods feature information may be the image data itself of the area including the goods, or may be a feature amount calculated from the image data of the area including the goods.

The store-visitor information DB 37 is a database of information about the users existing in the store 5. FIG. 5 is an example of data configuration of the store-visitor information DB 37. As shown, the store-visitor information DB 37 stores the store-visitor information relating to the user in the store 5 such as a registration ID, a temporary ID, a name, a type, a person image information, a store-leaving flag and a group ID. Incidentally, as will be described in detail later, the store-visitor information is generated at a timing when the user enters the store, and is updated at any time according to changes of the members of the group or the like, as long as the user and the group to which the user belongs exist in the store 5.

The registration ID is issued when a user registers a membership with the store, and is stored when the user entered the store 5 is a registrant. The temporary ID is identification information temporarily set to identify the user, and is issued and stored when the user entered the store 5 is not a registrant. The name is the name of the user who entered the store, and is stored by referring to the registrant information DB 35 when the user is a registrant. The type is information indicating whether the user who entered the store is a payer, a companion, or a person who is not determined as the payer or the companion. The person image information is image data of the area including the face of the user who entered the store (hereinafter also referred to as "face image data"). The store-leaving flag is a flag indicating whether the user has left the store 5 (left (y)) or not (not left (n)). When the store-visitor information is generated, the store-leaving information is set to "not left (n)". When the user goes out of the store 5 from the exit 18, it is determined that the user has left the store 5, and the store-leaving flag is set to "left (y)". The group ID is the identification information that identifies the group to which the user belongs.

If the user who does not belong to any group is visiting the store alone, the group ID may be left blank without storing anything, or a group ID may be set as a group of one user. Further, when there are multiple candidate groups to which the user may belong and it is difficult to determine one group, multiple group IDs of those candidate groups may be stored. In this case, it is desirable to store the group IDs in descending order of the accuracy to which the user belongs.

The purchasing goods list DB 38 is a database of information about the purchasing goods taken by users in store 5. FIG. 6 is an example of data structure of the purchasing goods list DB 38. As shown, the purchasing goods list DB 38 stores the purchasing goods list information such as a purchaser information, a purchasing goods ID, a goods name, a price, a number, a subtotal, a group ID and a total amount. Although the purchasing goods list information will be described in detail later, it is generated at a timing when the user takes the purchasing goods, and is updated as long as the user and the group to which the user belongs exist in the store 5.

The purchaser information is information indicating a user who took out the purchasing goods from the store shelf 14, and includes a registrant ID and a temporary ID. When the user is a registrant, the registrant ID is stored. When the user is an unregistered person, the temporary ID is stored. The purchasing goods ID is the goods ID of the purchasing goods. The goods name is the name of the purchasing goods, and the price is the price of the purchasing goods. The goods name and the price are stored by referring to the goods information DB 36 based on the goods ID of the purchasing goods. The number is the number of purchasing goods. The subtotal is the total amount of the price of the purchasing goods taken by each user. The group ID is the group ID of the group to which the user belongs. The total amount is the total amount of the price of all the purchasing goods taken by users belonging to the group.

Incidentally, if the user who does not belong to the group is visiting the store alone, the group ID and the total amount may be left blank without storing anything, or the group ID and the total amount may be stored as a group of one user.

The communication unit 32 communicates with the portable terminal 2 and the cameras 10 by wired or wireless communication.

The control unit 33 includes a CPU (Central Processing Unit), a ROM (Read Only Memory) and a RAM (Random Access Memory), which are not shown, and performs various controls for the components in the management server 1. In this example embodiment, the control unit 33 includes a person identifying unit 40, a tracking unit 41, a relationship degree calculation unit 42, an association unit 43, a group estimation unit 44, a presentation unit 45, a reception unit 46, a group setting unit 47, a payer setting unit 48, and a payment processing unit 49.

The person identifying unit 40 identifies the user who entered the store using the image data of the user acquired from the camera 10. Specifically, the person identifying unit 40 acquires the image data of the user who entered the store from the camera 10 provided near the entrance 16 of the store 5, and acquires the personal feature information of the user. At this time, the person identifying unit 40 may acquire the face image data from the image data of the user who entered the store. Then, the person identifying unit 40 compares the personal feature information of the entered user with the personal feature information of the respective registrants read from the registrant information DB 35 to determine whether or not the entered user is a registrant and who is the entered user if the entered user is a registrant. If the entered user is a registrant, the person identifying unit 40 generates a new store-visitor information including the registration ID and the name read from the registrant information DB 35, the user's face image data, and the store-leaving flag (n), and stores the new store-visitor information in the store-visitor information DB 37. On the other hand, if the entered user is not a registrant, the person identifying unit 40 generates a new store-visitor information including an issued temporary ID, the user's face image data, and the store-leaving flag (n), and stores the new store-visitor information in the store-visitor information DB 37.

The tracking unit 41 tracks the movement of each user in the store using the image data of the user acquired from the camera 10, and acquires the movement as tracking data. Specifically, the movements of the user 20, the user 22, and the user 24 tracked by the tracking unit 41 are shown by dotted lines in FIG. 1. When the user goes out from the exit 18 of the store 5, the tracking unit 41 determines that the user left the store 5, and sets the store-leaving flag of the store-visitor information DB 37 to "left (y)".

The relationship degree calculation unit 42 performs interaction detection using the image data of the user acquired from the camera 10 and/or the tracking data by the tracking unit 41, and calculates the relationship degree between the plurality of users by arbitrary determination elements. The determination elements for calculating the relationship degree may include, for example, the distance between users, the direction of the face, the opening and closing of the mouth, the physical movement, and the presence or absence of sharing the container carrying the goods. The relationship degree calculation unit 42 may calculate the relationship degree not only based on the information of the image data and the tracking data in the store, but the information of the image data and the tracking data in the parking lot and other stores, such that the users came in the same vehicle, or they were shopping together in other stores. Calculation of the relationship degree by the relationship degree calculation unit 42 is performed from time to time.

Here, the determination elements for calculating the relationship degree will be described in detail. The distance between users, which is a determination element, is measured by recognizing the coordinates of each user on the real world based on the user's image data. Specifically, the relationship degree calculation unit 42 acquires the physical distance between the users measured by the human body detection by machine learning and the camera calibration as the data relating to the distance between the users.

The direction of the face, which is another determination element, is detected by analyzing the line-of-sight based on the user's image data. Specifically, the relationship degree calculation unit 42 recognizes the direction of the user's face and what the user is looking at by face direction detection and gaze detection by machine learning, and acquires the registration ID or the temporary ID of the users who are looking at each other as the data relating to the face direction. Also, the relationship degree calculation unit 42 acquires the registration ID or the temporary ID of users who are looking at the same thing at the same time as the data related to the direction of the face.

Further, the relationship degree calculation unit 42 not only detects that the users look at each other at the same timing, but also acquires the number of times that the face and the eyes are directed to a predetermined user, as the data relating to the face direction. Specifically, the number of times that the face and the eyes are directed to a predetermined user may be, for example, the number of times the user A looks at the user B. The group estimation unit 44 described later may estimate that those users belong to the same group when the number of times that the face and the eyes are directed to a predetermined user is equal to or larger than a predetermined number of times. The condition for the group estimation unit 44 to estimate that the users belong to the same group can be arbitrarily set, such as "the number of times that the user A looks at the user B exceeds 5 times", "the number of times that the user A looks at the user B exceeds 3 times and the number of times that the user B looks at the user A exceeds 3 times", and the like.

Opening and closing of the mouth, which is another determination element, is detected by analyzing the user's mouth based on the image data of the user. Specifically, the relationship degree calculation unit 42 acquires the registration ID or the temporary ID of the uttering user as the data relating to the opening and closing of the mouth by the utterance detection using the machine learning.

The physical movement, which is another determination element, is detected by estimating the skeleton, posture, body shape, appearance, or silhouette of a person based on the user's image data, and detecting the physical contact between users, such as crossing arms or holding hands. Specifically, the relationship degree calculation unit 42 acquires the registration ID or the temporary ID of the users who are in physical contact, by the pose estimation using the machine learning, as the data relating to the physical contact.

As the presence or absence of sharing the container, which is another determination element, it is detected whether or not the container such as a cart, a basket, and a reusable bag containing the purchasing goods is shared by multiple users based on the user's image data. Specifically, the relationship degree calculation unit 42 acquires the registration ID or the temporary ID of the users sharing the container as the data.

Incidentally, the relationship degree calculation unit 42 may calculate the relationship degree from one determination element, or may calculate the relationship degree by combining a plurality of determination elements. For example, the relationship degree calculation unit 42 may detect the users talking to each other by two determination elements such as "opening and closing the mouth" and "the direction of the face" to calculate the relationship degree. Further, the relationship degree calculation unit 42 may calculate the relationship degree by considering the attribute information. Further, the relationship degree calculation unit 42 may calculate the relationship degree using not only the image data but the tracking data.

The association unit 43 uses the image data of the user acquired from the camera 10 to identify the user who took the purchasing goods and the purchasing goods taken by the user. Further, the association unit 43 associates the identified user and the identified purchasing goods with each other, and stores them in the purchasing goods list DB 38.

Figure 7:
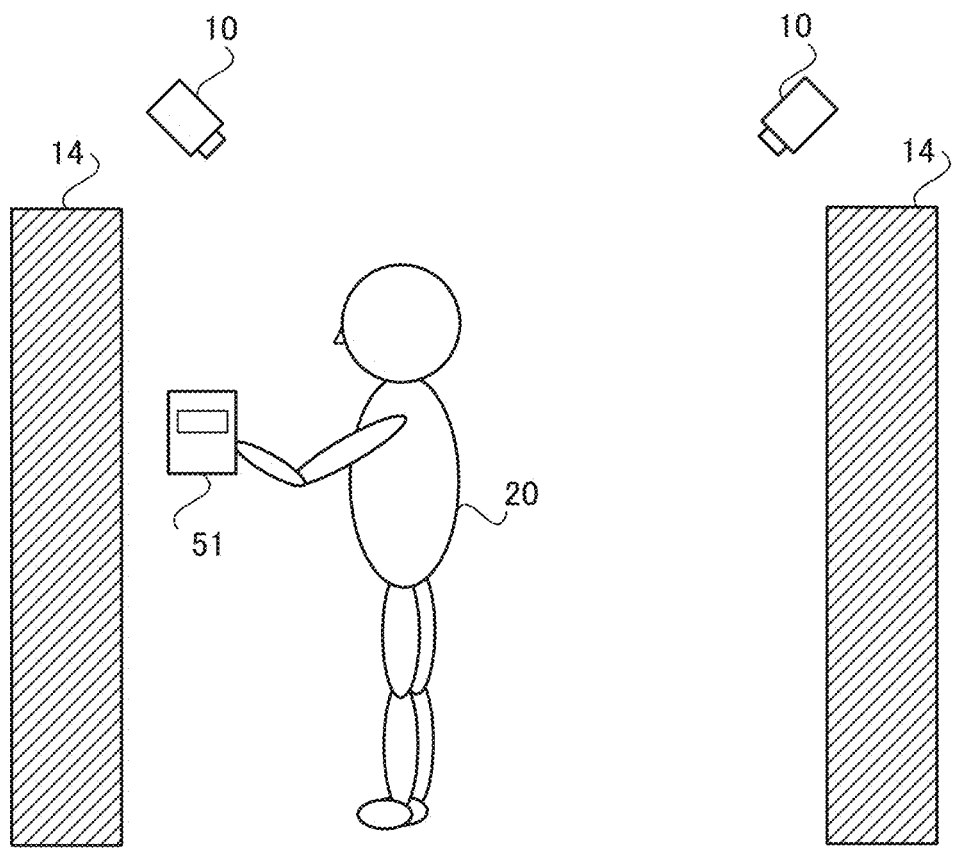
FIG. 7 is a schematic view showing a state in a store.

FIG. 7 is a schematic diagram showing a state of the store 5 according to the first example embodiment. The store shelves 14 are installed in the store 5, and goods are arranged in the store shelves 14. Further, near the store shelf 14, the camera 10 is provided at a position capable of imaging the area including the face of the user 20 and the purchasing goods 51.

Specifically, the association unit 43 acquires the image data of the area including the goods from the camera 10, and acquires the goods feature information of the purchasing goods 51 from the image data. The association unit 43 detects that the purchasing goods 51 are taken out from the store shelf 14 using the goods feature information of the purchasing goods 51. Detection that the purchasing goods 51 are taken out from the store shelf 14 is performed, for example, by detecting, among a plurality of image data successive in time series, the goods feature information of the purchasing goods 51 moves out from the area corresponding to the store shelf 14 to outside (or from a position in contact with the store shelf 14 to a position not in contact with the store shelf 14). The area corresponding to the store shelf 14 in the image data may be pre-recorded as the coordinates in the image data, or may be determined by image recognition of the store shelf 14 from the image data. Further, the association unit 43 may detect that the user 20 took the purchasing goods 51 by detecting from the image data that the purchasing goods 51 are put into the cart. The association unit 43 identifies the purchasing goods 51 by comparing the goods feature information of the purchasing goods 51 with the goods feature information read from the goods information DB 36, and acquires the goods ID, the goods name, and the price of the purchasing goods 51.

Further, the association unit 43 acquires the face image data of the user 20 who took the purchasing goods 51 from the camera 10. The user 20 who took the purchasing goods 51 is, for example, a user closest to the purchasing goods 51. The association unit 43 identifies the user 20 who took the purchasing goods 51 by comparing the personal feature information of the face image data of the user 20 who took the purchasing goods 51 with the personal feature information of the face image data read from the store-visitor information DB 37, and acquires the registered ID or the temporary ID of the user 20.

Then, the association unit 43 stores the registration ID or the temporary ID of the user 20 who took the purchase goods 51, the goods ID of the purchase goods 51, the goods name, the price and the number of the goods into the purchase goods list DB 38. At this time, the association unit 43 calculates the subtotal and stores it in the purchasing goods list DB 38 together. Further, when the user belongs to the group, the association unit 43 calculates the total amount and updates the purchasing goods list DB 38.

The method of identifying the user 20 who took the purchasing goods 51 may be a method of acquiring the image data of the area including the hand of the user from the camera 10 and identifying the user based on the position and movement of the hand, or a method based on the tracking data.

The group estimation unit 44 estimates a group including a plurality of users based on the image data acquired from the camera 10, the attribute information, the relationship degree, and the like. For example, the group estimation unit 44 considers the attribute information, and estimates that users whose relationship degree is equal to or larger than the threshold value belong to the same group. Incidentally, when there is no user having a relationship degree equal to or larger than the threshold value, the group estimation unit 44 estimates that the user is shopping alone. Estimation of the group by the group estimation unit 44 is performed at any time while the user is present in the store 5.

Thus, by estimating the group based on the relationship degree calculated by combining various determination elements, the management server 1 can improve the accuracy of setting the group. Further, by considering the attribute information stored in advance before entering the store, the management server 1 can estimate and set the group more accurately.

Further, the group estimation unit 44 estimates the payer from among the users belonging to the group. The group estimation unit 44 estimates the user as the payer when it is estimated that the user is shopping alone.

Details of the group estimation method and the payer estimation method will be described later.

The presentation unit 45 presents the estimation result of the group by the group estimation unit 44 to the user. Also, the presentation unit 45 presents the estimation result of the payer by the group estimation unit 44 to the user. Specifically, the presentation unit 45 presents the estimation result to the user who is estimated or set as the payer of the group. Since the user estimated or set as the payer is a registrant who has stored the payment information, the presentation unit 45 transmits the estimation result to the portable terminal 2 used by the user based on the contact information read from the registrant information DB 35. For example, the presentation unit 45 transmits the group confirmation screen as an estimation result. The mobile terminal 2 displays the received group confirmation screen, and the user performs predetermined operations to be described later on the group confirmation screen.

Thus, by presenting the estimation result to the user who is estimated or set as the payer, the user who pays the price of the purchasing goods can add or exclude other users belonging to the group.

Figure 8A:
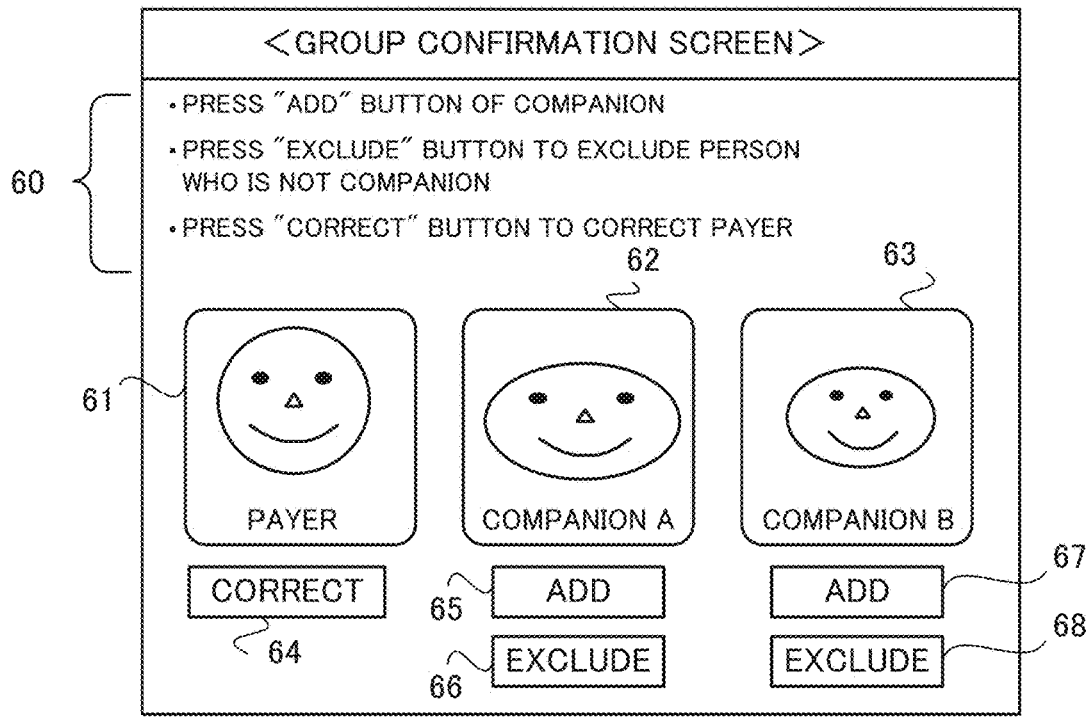
FIGS. 8A and 8B are a display examples of a group confirmation screen.
Figure 8B:
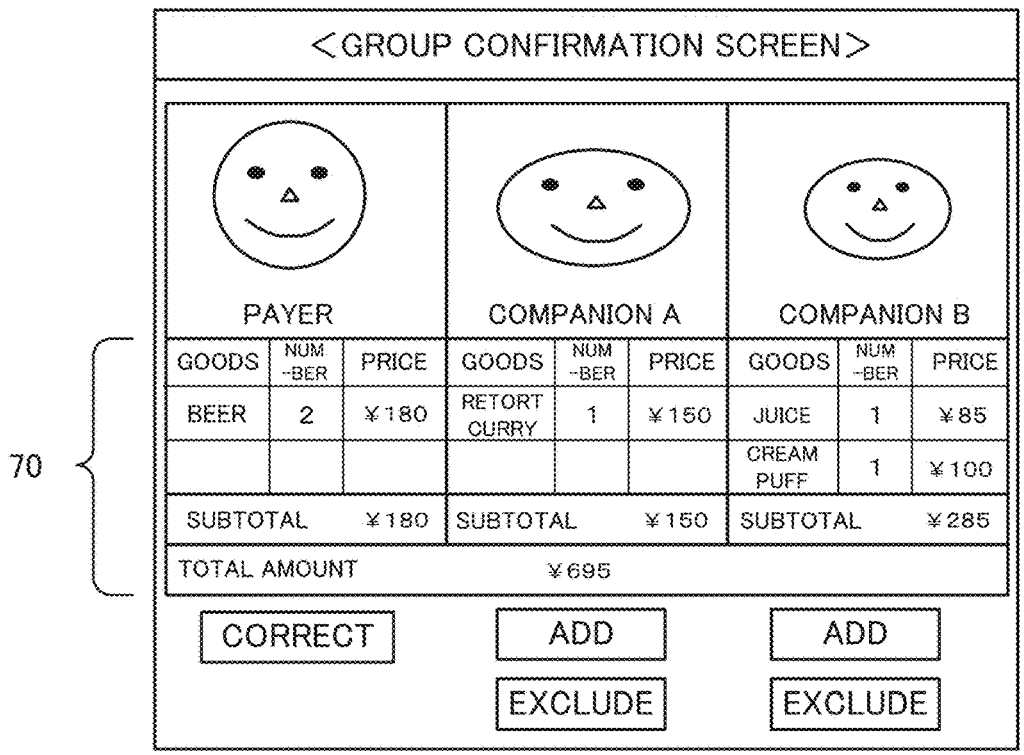

The group confirmation screen will now be described. FIGS. 8A and 8B are examples of the group confirmation screen. As shown in FIG. 8A, the group confirmation screen includes an instruction 60 to the user, face image data 61 of the user estimated to be the payer (hereinafter also referred to as "payer face image data"), face image data 62 and 63 of the users estimated to be the companions (hereinafter also referred to as "companion face image data"), a correction button 64, addition buttons 65 and 67, and exclusion buttons 66 and 68.

The payer face image data 61 is face image data of the user estimated to be the payer, and is read from the store-visitor information DB 37. As described in the instruction 60, the correction button 64 is pressed to designate the correct payer when the payer is wrong. Specifically, the user may designate the payer by inputting the name or the registration ID of the correct payer after pressing the correction button 64, or may designate the payer by imaging the correct payer with a camera built in the portable terminal 2 and sending the face image data of the correct payer.

The companion face image data 62 and 63 are face image data of the users estimated to be the companions, and are read from the store-visitor information DB 37. As described in the instruction 60, the addition buttons 65 and 67 are pressed to approve that the users belong to the same group when the users indicated by the companion face image data 62 and 63 are the companions. On the other hand, as described in the instruction 60, the exclusion buttons 66 and 68 are pressed to disapprove that the users belong to the same group and to exclude the users when the users indicated by the companion face image data 62 and 63 are not the companions. Pressing and predetermined operations of the various buttons by the user are transmitted from the portable terminal 2 to the management server 1 as the response to the estimation result.

Thus, by presenting the group confirmation screen including the user's face image data as the estimation result, the user can easily recognize the users constituting the group to which the user belongs. Therefore, the user can accurately respond to the estimation result, and the management server 1 can increase the accuracy of setting the group.

If the group confirmation screen does not include a user who is shopping together, the user may designate a user belonging to the same group by imaging the user who is shopping together with the camera built in the mobile terminal 2 and transmitting the face image data to the management server 1. Specifically, when the user 24 who is his/her daughter is not included in the group confirmation screen that is the estimation result of the group, the user 20 illustrated in FIG. 1 images the user 24 by the camera built in the portable terminal 2 and transmits the face image data of the user 24 to the management server 1. The management server 1 checks whether or not a user indicated by the face image data exists in the store 5 based on the face image data of the user 24, and if so, sets the user 24 to belong to the same group as the user 20.

Further, while the group confirmation screen as shown in FIG. 8A is presented as the estimation result in this example embodiment, it is not limited to this example. If the presentation of the estimation result and the response by the user are possible, the screen configuration is arbitrary. For example, as shown in FIG. 8B, the purchasing goods list 70 based on the purchasing goods list information may be displayed together so that the purchasing goods taken by each user indicated by the payer face image data and the companion face image data can be understood. This allows the user to determine whether to add or exclude the user from the same group after checking what each user has taken.

Additionally, the presentation of the estimation result by the presentation unit 45 may be performed at an arbitrary timing at which the member of the group is changed, in addition to the timing when the user enters the store. Further, the presentation unit 45 is not limited to present the estimation result to the user estimated or set as the payer of the group, and may present the estimation result to all the users belonging to the group. Specifically, when the store 5 is provided with a shared terminal that can be used freely by the users, the presentation unit 45 can present the estimation result to all the users by transmitting the estimation result to the shared terminal. Here, the shared terminal is a tablet terminal or the like similar to the portable terminal 2, and is communicatively connected to the management server 1.

The reception unit 46 receives the user's response to the estimation result presented by the presentation unit 45 from the portable terminal 2 used by the user through the communication unit 32. Specifically, the reception unit 46 acquires, as the response, information of correcting the estimation result, the designation, the addition and the exclusion of the user, and the like.

The group setting unit 47 sets the group based on the estimation result and the response to the estimation result. Then, the group setting unit 47 issues a group ID for identifying the group, and stores the group ID of each user belonging to the group in the store-visitor information DB 37. For example, a hyphen is stored in the group ID of a user who does not belong to the group. Also, the group setting unit 47 stores the group ID of each user belonging to the group in the purchasing goods list DB 38, and calculates and stores the total amount of all the purchasing goods taken by the users belonging to the same group.

The payer setting unit 48 sets the payer based on the estimation result and the response to the estimation result. Then, the payer setting unit 48 stores the type of the user who is the payer as the payer and the type of the user who is the companion as the companion in the store-visitor information data DB 37.

The payment processing unit 49 collectively performs the payment processing of all the purchasing goods that are taken by the users belonging to the group using the payment information of the payer by referring to the registrant information DB 35 at the timing when all the users belonging to the group goes out from the exit 18 of the store 5. The payment processing is to pay money based on the payment information. Specifically, the payment processing unit 49 authenticates the payer by the biometric authentication and performs the payment processing on the basis of the payment information of the authenticated payer. Here, as the biometric authentication, authentication using a face image, iris, fingerprint, gait, voice, or the like may be exemplified.

The presentation unit 45 may transmit the purchasing goods list information to the portable terminal 2 used by the payer through the communication unit 32 before the payment processing by the payment processing unit 49 is performed. FIG. 9A is an example of a purchasing goods list screen. Specifically, as shown in FIG. 9A, the purchasing goods list screen includes the payer face image data and the companion face image data. The purchasing goods list screen displays the goods name, the number, the price, and the subtotal of the purchasing goods taken by each user indicated by the face image data, the total amount of all the purchasing goods taken by each user, and the approval button 72. In this case, when the approval button 72 is pressed by the user, the payment processing unit 49 acquires information indicating that the purchasing goods list has been approved from the portable terminal 2 through the communication unit 32, and performs the payment of all the purchasing goods. Namely, the payment processing unit 49 may perform the payment processing after the user confirms the purchasing goods and approves the payment.

Further, the purchasing goods list screen is not limited to the one including the payer face image data and the companion face image data. As shown in FIG. 9B, if the correspondence between the users constituting the group and the purchasing goods taken by each user is known, the screen configuration is arbitrary.

In the above configuration, the storage unit 31 is an example of the storage means, the person identifying unit 40 is an example of the person identifying means, and the relationship degree calculation unit 42 is an example of the relationship degree calculation means. In addition, the group estimation unit 44 is an example of a group estimation means and a payer estimation means, the presentation unit 45 is an example of a group presentation means and a payer presentation means, the group setting unit 47 is an example of a group setting means, and the payer setting unit 48 is an example of a payer setting means. Further, the payment processing unit 49 is an example of a payment processing means.

(Portable Terminal)

Figure 10:
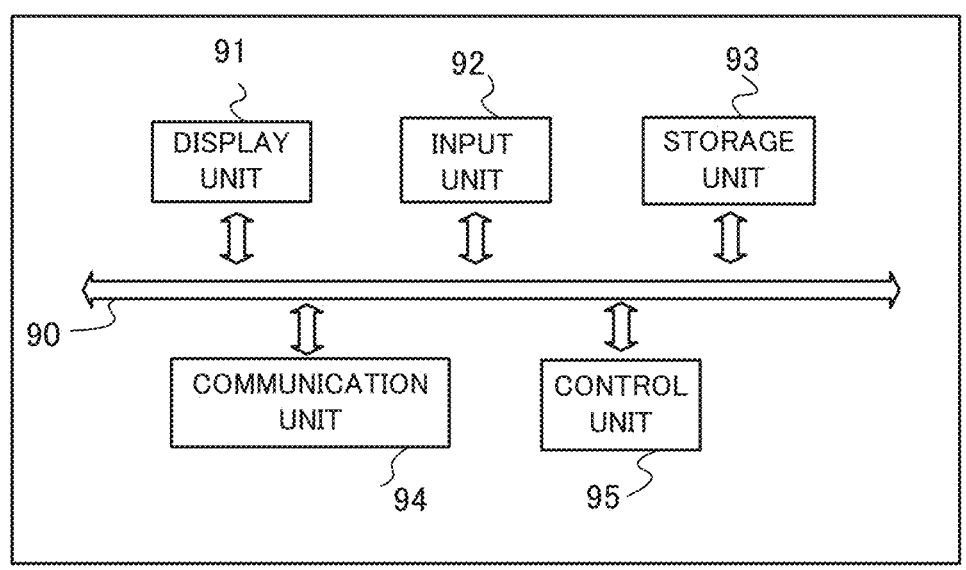
FIG. 10 illustrates a schematic configuration of a portable terminal.

FIG. 10 shows a schematic configuration of the portable terminal 2. The portable terminal 2 mainly includes a display unit 91, an input unit 92, a storage unit 93, a communication unit 94, and a control unit 95. Each of these elements is connected to each other via a bus line 90.

The display unit 91 displays various information such as the group confirmation screen and the purchasing goods list screen based on the control of the control unit 95.

The input unit 92 is an interface that accepts an input of a user by a predetermined operation on the group confirmation screen or the purchasing goods list screen, and may be a touch panel, a button, a voice input device, or the like.

The storage unit 93 is configured by a memory such as a hard disk or a flash memory. The storage unit 93 stores a program to be executed by the control unit 95, and the information necessary for the control unit 95 to execute a predetermined processing by executing a program. For example, the storage unit 93 may be activated when shopping is performed at the store 5. The storage unit 93 may store a dedicated application program for controlling the display of various screens such as the group confirmation screen and the purchase goods list screen.

The communication unit 94 communicates with the management server 1 through wireless communication. The control unit 95 includes a CPU, ROM and RAM, which are not shown, and performs various controls for each component in the portable terminal 2.

[Group Estimation Method and Payer Estimation Method]

Next, the group estimation method and the payer estimation method will be described.

(Group Estimation Method Based on User's Behavior before Entering the Store)

For the users who are families such as husbands, parents, and children, such information is stored in the registrant information DB 35 in advance as the attribute information. In this case, the group estimation unit 44 estimates the group of the users present in the store 5 based on the attribute information read from the registrant information DB 35. Incidentally, without using the attribute information, the accounts at the time of member registration may be coordinated within the family. Further, for the family member who cannot make a registration and hence does not have an account, such as an underage user or the like, the face image of the user may be registered in advance and stored in the registrant information DB 35.

The group estimation unit 44 may calculate the relationship degree based on the image data acquired from the camera 10 provided in the parking lot outside the store, and may estimate the group of the users present in the store 5. Specifically, based on the image data, the group estimation unit 44 estimates the users who were in the same vehicle to belong to the same group.

If the store 5 is a large shopping mall facility, the group estimation unit 44 may estimate the group established in another store in the shopping mall to be the group of users existing in the store 5. In such cases, the registrant information DB 35 and the store-visitor information DB 37 may be shared among the stores in the shopping mall.

The store-visitor information and the purchasing goods list information when the user used the store 5 in the past may be stored in the storage unit 31 as the history information, and the group estimation unit 44 may calculate the relationship degree based on the history information to estimate the group of the users present in the store 5. Specifically, since the users who entered the store together last time are likely to belong to the same group, the group estimation unit 44 estimates that they are in the same group this time too.

When the goods purchasing application (for example, Amazon application) used by the user for shopping at the store 5 using the portable terminal 2 is in cooperation with other SNS (Social Networking Service) applications (for example, a Line, Facebook, or the like), the group estimation unit 44 may specify a user having a relationship degree such as a friend in the SNS application, and estimate the specified users to belong to the same group if they exist in the store 5.

Based on the information of the SNS application used by the user in the portable terminal 2, if the time and the position information of the plurality of users are the same, the group estimation unit 44 may estimate those plurality of users to be in the same group.

(Payer Estimation Method Based on User's Behavior before Entering the Store)

The users who are families, such as husband and wife, or parent and child, specify in advance who is the payer in the family before entering the store, and store it as the type in the store-visitor information DB 37. In this case, the group estimation unit 44 estimates the payer of the group based on the type read from the store-visitor information DB 37.

For the friends, the way of payment such as split-payment, collective payment, or who becomes a payer is different every time, and it is difficult to store the payer as the attribute information or the type in advance like the case of a family. Therefore, the group estimation unit 44 may estimate a user who first entered the store in the group as a payer, based on the image data acquired from the camera 10 provided in near the entrance 16.

The group estimation unit 44 may estimate the user driving the vehicle to be the payer, based on the image data obtained from the camera 10 provided in the parking lot outside the store. Further, the group estimation unit 44 may identify the store visiting means of the user and estimate the user who came by a vehicle to be the payer, based on the image data acquired from the camera 10 provided outside the store.

(Group Estimation Method Based on User's Behavior in Store)

The relationship degree calculation unit 42 calculates the relationship degree by interaction detection between the users in the store 5, and the group estimation unit 44 estimates the group based on the relationship degree. At this time, the relationship degree calculation unit 42 may calculate the relationship degree in consideration of the attribute information or the tracking data, or the group estimation unit 44 may estimate the group in consideration of the attribute information or the tracking data.

(Payer Estimation Method Based on User's Behavior in Store)

The group estimation unit 44 estimates the user moving the cart to be the payer based on the image data acquired from the camera 10 provided in the store 5. It is not limited to the cart, and the group estimation unit 44 may estimate that a user who has a container in which to put the purchasing goods such as a basket or a reusable bag is the payer.

The group estimation unit 44 may acquire the appearance information of the user based on the image data acquired from the camera 10 provided in the store 5, and may estimate the payer based on the appearance information. Specifically, the group estimation unit 44 estimates a user to be the payer, who satisfies a condition such as "40s male" or "wearing brand goods" set in advance based on the estimated age, gender, height, body shape, clothing, accessories, and the like that can be discriminated from the appearance information.

When the voice data can be acquired from the camera 10 provided in the store 5, the group estimation unit 44 may specify a user who has made a statement such as "today I will pay" based on the image data and the voice data, and may estimate the user to be the payer.

When the body data relating to the user's heart rate or the body temperature can be acquired from the camera 10 or the sensor provided in the store 5, the group estimation unit 44 may estimate the user having a high heart rate or body temperature to be the payer based on the body data, because the payer is likely to be in a tense state.

If the payment information of only one user in the group is registered in the registrant information DB, i.e., there is only one user who is the registrant, the group estimation unit 44 estimates the user to be the payer.

The store-visitor information and/or the purchasing goods list information generated when the user used the store 5 in the past may be stored in the storage unit 31 as the history information, and the group estimation unit 44 may estimate that the user who has experienced the payer in the past is the payer based on the history information. Further, for example, when the user purchased cheaper goods than the past purchasing goods according to the history information, the group estimation unit 44 may determine that it is highly possible that the user himself or herself is the payer, and estimate the user to be the payer.

Thus, even if the payer is not stored in the storage unit 31 before entering the store, the group estimation unit 44 can estimate the payer based on the behavior of the user in the store.

(Group Estimation Method Based on User's Behavior Immediately before Payment)

When the camera 10 or the shared terminal is provided near the exit 18, it is assumed that the users shopping together are imaged by the camera 10 or the shared terminal. In this case, the group estimation unit 44 may estimate that the users included in the same image data belong to the same group, based on the image data acquired from the camera 10 and the shared terminal.

When the users crossing arms or holding hands are detected by the interaction detection based on the image data acquired from the camera 10 provided near the exit 18 of the store 5, the group estimation unit 44 may estimate that those users belong to the same group.

Thus, by using the image data including all the group members acquired near the exit 18, the group estimation unit 44 can accurately estimate and set the group to which the users belong and the users constituting the group.

(Payer Estimation Method Based on User's Behavior Immediately before Payment)

Based on the image data acquired from the camera 10 or the shared terminal provided near the exit 18, the group estimation unit 44 may estimate the user who raises the hand near the outlet as the payer.

The group estimation unit 44 may use the above-described one or more elements to estimate the group of users existing in the store 5.

[Group Payment Processing]

Next, an outline of the group payment processing performed by the facility management system 100 will be described. The group payment processing is a processing of setting groups and payers for the users who entered the store 5. Also, the group payment processing is a processing of collectively performing the payment for the total amount of all the purchasing goods taken by the users belonging to the group on the basis of the payment information of the payer.

Figure 11:
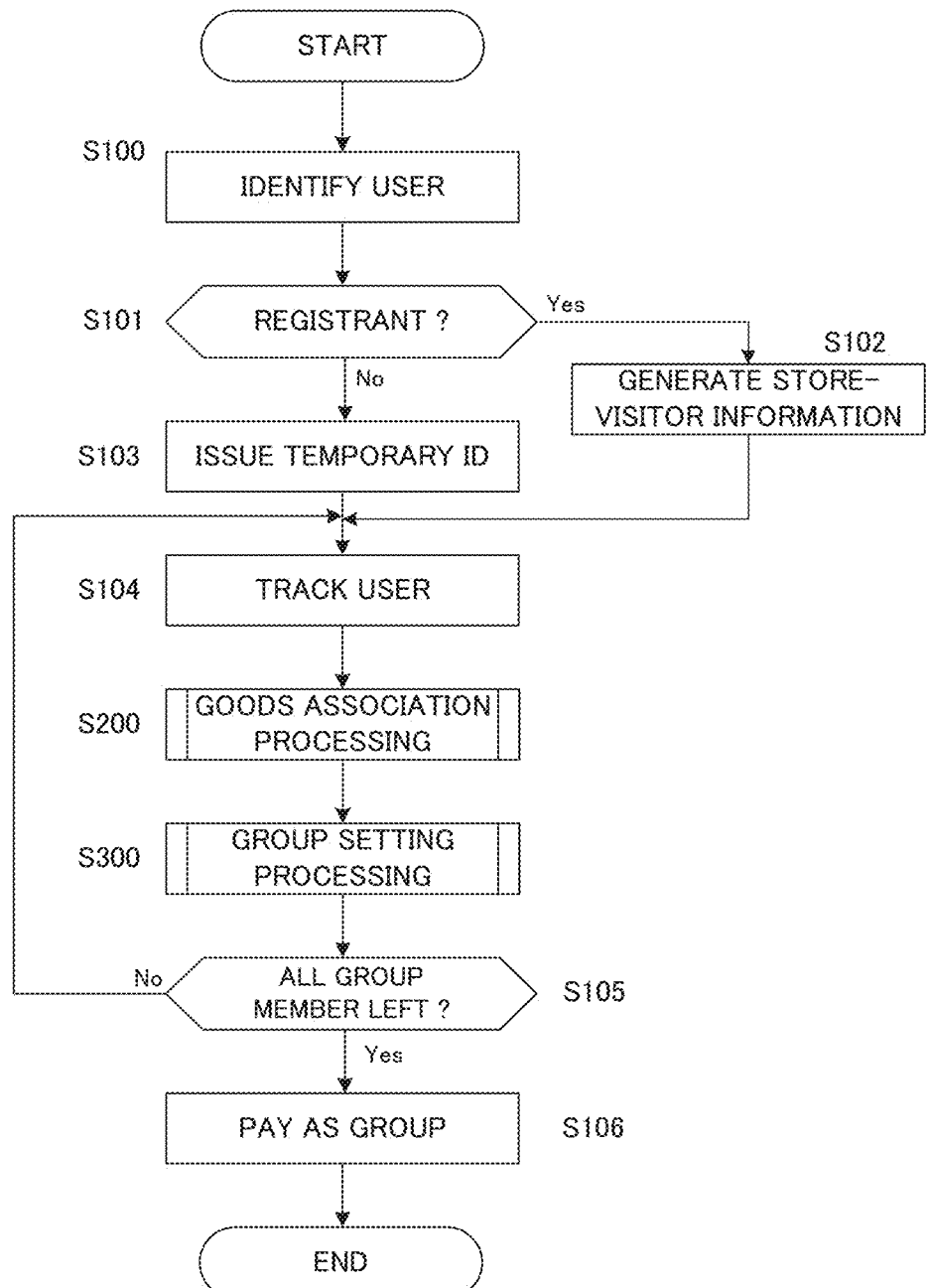
FIG. 11 is a flowchart of a group payment processing according to the first example embodiment.

FIG. 11 is a flowchart showing an outline of the group payment processing according to the first example embodiment. The group payment processing includes a goods association processing S200 and a group setting processing S300. Incidentally, the group payment processing is realized mainly by the management server 1 which executes a program prepared in advance.

When the user entered the store 5, the management server 1 identifies the user who entered the store based on the image data acquired from the camera 10 provided near the entrance 16 (step S100). Specifically, the management server 1 acquires the user's face image data and the personal feature information based on the acquired image data. Then, the management server 1 identifies whether the user who entered the store is a registrant or not and who is the registrant, if the user is a registrant, by comparing the personal feature information of the user who entered the store with the personal feature information of the respective registrants read from the registrant information DB 35.

The management server 1 determines whether or not the identified user is a registrant (step S101). When the user is a registrant (step S101; Yes), the management server 1 generates a new store-visitor information including the registration ID and the name read from the registrant information DB 35, the user's face image data, and the store-leaving flag (n), and stores it in the store-visitor information DB 37 (step S102). On the other hand, when the user is not a registrant (step S101; No), the management server 1 issues a temporary ID, generates a new store-visitor information including the temporary ID, the user's face image data, and the leaving flag (n), and stores the new store-visitor information in the store-visitor information DB 37 (step S103).

Then, the management server 1 tracks the movement of each user in the store 5 using the image data of the user acquired from the camera 10, and acquires the tracking data (step S104). In addition, the management server 1 performs the goods association processing (step S200).

Figure 12:
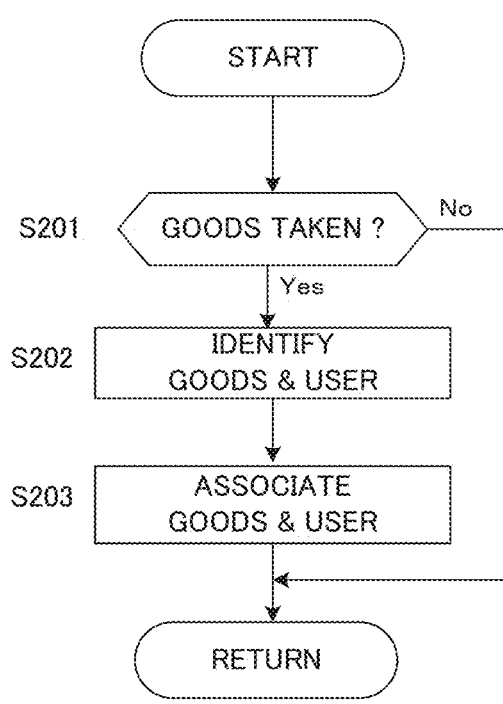
FIG. 12 is a flow chart of a goods association processing.

Next, the goods association processing will be described. The goods association processing is a processing of associating the purchasing goods taken by a user with the user. FIG. 12 is a flow chart of the goods association processing. This processing is executed by the management server 1.

The management server 1 determines whether or not goods are taken by the user based on the image data acquired from the camera 10 (step S201). Specifically, the management server 1 acquires the image data of the area including the goods from the camera 10, and acquires the goods feature information from the image data. Then, the management server 1 detects that the goods are taken out from the store shelf 14 using the goods feature information. When the goods have not been taken (step S201; No), the management server 1 ends the goods association processing, and proceeds to the group setting processing S300 shown in FIG. 11.

On the other hand, when the goods are taken (step S201; Yes), the management server 1 identifies the taken goods and the user who has taken the goods using the image data acquired from the camera 10 (step S202). Specifically, the management server 1 identifies the purchasing goods by comparing the goods feature information of the purchasing goods with the goods feature information read from the goods information DB 36, and acquires the goods ID, the goods name, and the price of the purchasing goods. Further, the management server 1 identifies the user who has taken out the purchasing goods by comparing the personal feature information of the face image data of the user who has taken out the purchasing goods with the personal feature information of the face image data read from the store-visitor information DB 37, and acquires the registered ID or the temporary ID of the user. Then, the managing server 1 associates the identified purchasing goods and the identified user, and stores them in the purchasing goods list DB 38 (step S203). Then, the management server 1 ends the goods association processing, and proceeds to the group setting processing S300 shown in FIG. 11.

Figure 13:
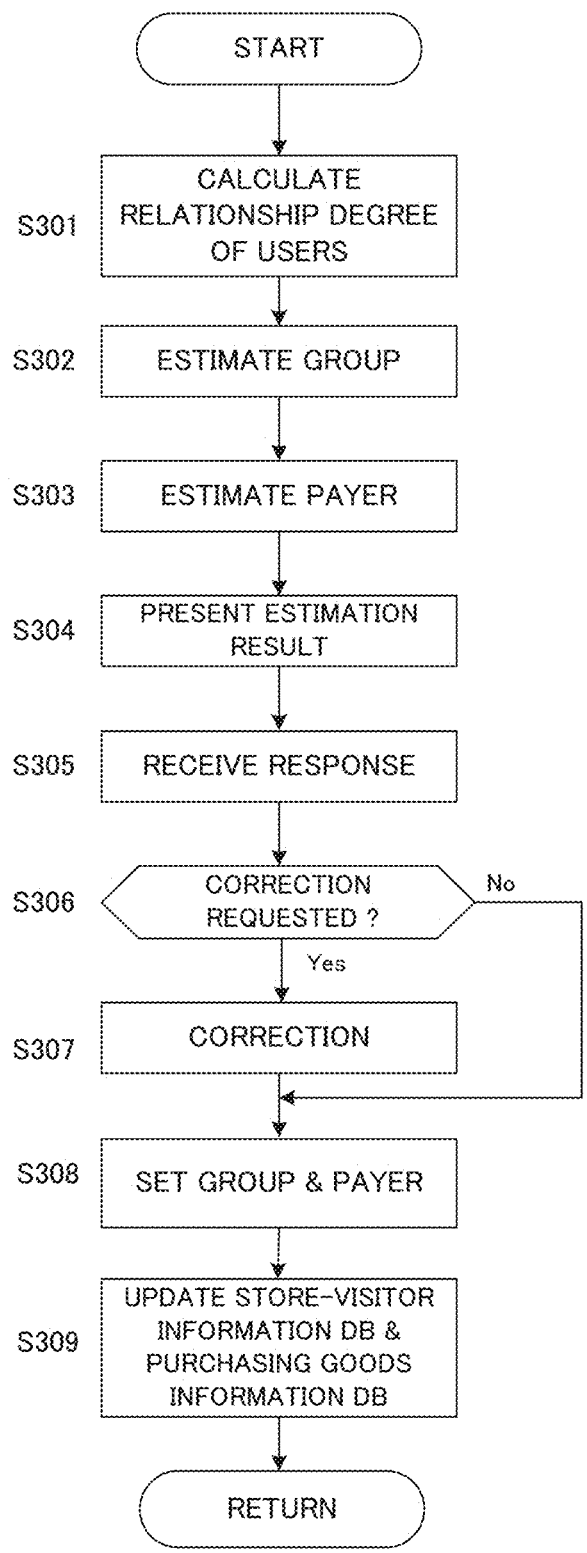
FIG. 13 is a flowchart of a group setting processing.

Next, the group setting processing will be described. The group setting processing is a processing of setting the group to which the user belongs and the payer of the group. FIG. 13 is a flowchart of the group setting processing. This processing is executed by the management server 1.

The management server 1 performs interaction detection using the image data of the user acquired from the camera 10 or the tracking data by the tracking unit 41, and calculates the relationship degree between the plurality of users existing in the store 5 by arbitrary determination elements (step S301). The determination element for calculating the relationship degree may include, for example, the distance between the users, the direction of the face, the opening and closing of the mouth, the physical movement, and the presence or absence of sharing the container carrying the goods. The management server 1 calculates the relationship degree at any time.

Then, the management server 1 estimates a group including a plurality of users based on the attribute information stored in advance and the calculated relationship degree. For example, the group estimation unit 44 estimates that the users whose relationship degree is equal to or higher than the threshold belong to the same group in consideration of the attribute information (step S302). When there is no user whose relationship degree is equal to or higher than the threshold, the management server 1 estimates that the user does not belong to the group and is shopping alone.

Further, the management server 1 estimates the payer from among the users constituting the group (step S303). When it is estimated that the user does not belong to the group and is shopping alone, the management server 1 estimates the user to be the payer.

Next, the management server 1 presents the estimation result of the group and the payer to the user (step S304). Specifically, the management server 1 presents the estimation result of the group and the payer to the user estimated or set to be the payer of the group. Since the user estimated or set to be the payer is basically a registrant who has stored the payment information, the management server 1 transmits the estimation result of the group and the payer to the portable terminal 2 used by the user on the basis of the contact information read from the registrant information DB 35. Specifically, the management server 1 transmits the group confirmation screen as the estimation result to the portable terminal 2.

The mobile terminal 2 displays the received group confirmation screen, and the user performs predetermined operations in accordance with the instruction on the group confirmation screen. The management server 1 receives, via the communication unit 32, information relating to the predetermined operations by the user from the portable terminal 2 as the response to the estimation result (step S305). Specifically, the management server 1 acquires information regarding the correction to the estimation result as the response.

The management server 1 determines whether or not the response to the estimation result includes the correction (step S306). Here, the correction includes the information about the exclusion of the companion in the estimation result of the group and the information about the correction to the estimation result of the payer.

If the response to the estimate result includes the correction (step S306; Yes), then the management server 1 corrects the estimated group and the payer (step S307). Specifically, if the information about the exclusion of the companion is included as the response to the estimation result of the group, the management server 1 excludes the companion whose exclusion button is pressed from the group, and adds the companion whose addition button is pressed to the group. Also, if the information about the correction to the estimation result of the payer is included, the management server 1 sets the payer according to the correction (step S308). On the other hand, if the response to the estimation result does not include any correction (step S306; No), the management server 1 sets the estimated group and the estimated payer to the group and the payer as they are (step S308).

When the setting of the group and the payer is completed, the management server 1 updates the store-visitor information DB 37 and the purchasing goods list DB 38 (step S309). Specifically, the management server 1 sets the group, issues a group ID for identifying the group, and stores the group ID of each user belonging to the group in the store-visitor information DB 37. For the user who does not belong to any group, a hyphen is stored in the group ID, for example. Further, the management server 1 stores the group ID of each user belonging to the group in the purchasing goods list DB 38, and calculates and stores the total amount of all the purchasing goods taken by the users belonging to the same group. Furthermore, the management server 1 sets the payer, and stores the type of the user who is the payer as the payer and the type of user who is the companion as the companion.

Then, the management server 1 ends the group setting processing, and proceeds to step S105 of the group payment processing shown in FIG. 11.

The management server 1 refers to the store-leaving flags of the store-visitor information DB 37, and determines whether or not all the users belonging to the group has left the store (step S105). When all the users belonging to the group have not left yet, i.e., one or more users belonging to the group is still present in the stores 5 (step S105; No), the management server 1 returns to step S104, and tracks the user, associates the user with the goods, estimates and sets the group as needed according to the behavior of the user in the store 5.

On the other hand, when all the users belonging to the group have left the store 5 (step S105; Yes), the management server 1 collectively performs the payment for the total amount of all the purchasing goods taken by the users belonging to the group by the payment information of the payer by referring to the registrant information DB 35 (step S106). Specifically, the payment processing unit 49 authenticates the payer by the biometric authentication, and performs the payment based on the payment information of the authenticated payer. Incidentally, in case that the user enters the store alone and does not belong to the group, when the user has left the store 5, the management server 1 determines that all the members of the group has left the store. Thus, the group payment processing according to the first example embodiment ends.

As described above, the facility management system 100 of the present example embodiment estimates the group and the payer for the users who entered the store 5, and presents the estimation result to the user. Then, the facility management system 100 sets the group and the payer based on the response to the estimation result. Further, the facility management system 100 carries out the payment processing for the total amount of all the goods taken by the users belonging to the group at a time based on the payment information of the payer.

According to this, even a user who is not registered as a member can shop in the store 5 by belonging to the group including the payer. Therefore, even underage children who do not have payment information and cannot make registration as members can enjoy shopping in the store 5 together with their family.

Further, although the facility management system 100 automatically estimates the group by interaction detection or the like, since the estimation result is presented to the user to be confirmed, the accuracy of the group setting can be improved. Therefore, it is possible to prevent that another person who is not shopping together is set to the same group, and avoid paying for the purchasing goods of another person.

Further, although the facility management system 100 automatically estimates the payer by the image data acquired from the camera 10 or the like, since the estimation result is presented to the user to confirm, the accuracy of setting the payer can be improved.

In the present unmanned or labor-saving AI stores, a user needs to register as a member in advance, and an unregistered person is unable to enter the store. In addition, in the unmanned or labor-saving AI stores, it is basically assumed that users with the member registration do the shopping alone, and it is not assumed that a group of users such as a family or friends do the shopping together. However, according to the above-described facility management system 100, it is possible to provide a system in which the user can enter the store and do the shopping in the automated or unmanned facility, without the registration as the member in advance.

Modification

First Modification

In the above-described example embodiment, the association unit 43 identifies the purchasing goods taken by the user by using the image data of the user acquired from the camera 10 and the goods feature information. However, not limited to this, the association unit 43 may also use the location information to identify the purchasing goods. Here, the location information is, for example, information such as "onigiri (rice balls) are arranged at the first row from the top of the predetermined store shelf 14", and "onigiri are arranged in the order of pickled ume onigiri, salmon onigiri, and tuna onigiri from the left". The specification and format of the location information, such as the image data at the time of goods display and the coordinates in the image data, are arbitrary.

Further, in order to identify the purchasing goods, the association unit 43 may use, not only the image, but a weight sensor incorporated in the store shelf 14. In this case, a weight sensor is provided on each store shelf. For example, when it is detected that the weight of one onigiri has decreased from the display area of the salmon onigiri, the association unit 43 determines that the salmon onigiri is taken out, and identifies the purchasing goods. The association unit 43 can improve the accuracy of identifying the purchasing goods and reduce mistakes by combining the image analysis with the weight sensor.

Second Modification

When it is estimated that one user belongs to a plurality of groups, the group estimation unit 44 may estimate the group based on a predetermined priority. The predetermined priority is stored in the registrant information DB 35.

Third Modification

In the above-described example embodiment, the users belonging to the same group share the container such as a cart, a basket or a reusable bag. Not limited to this, each user may put the purchasing goods in various containers. In this case, the group estimation unit 44 does not estimate the payer based on the presence or absence of sharing the container, and estimates the payer based on other determination element.

Fourth Modification

In the above-described example embodiment, one payer is set for one group, and the payment processing for the total amount of all the goods taken by the users belonging to the group is performed collectively at a time on the basis of the payment information of the payer. However, not limited to this, a plurality of payers may be set for one group, and the payment processing may be performed based on the payment information of each payer. In this case, the total amount of all the goods taken by the users belonging to the group is divided by the number of payers, and the payment processing for the divided amount is performed on the basis of the payment information of each payer. Incidentally, instead of dividing the total amount, an arbitrary payment amount may be set to each payer. For example, when the total amount is 8000 yen and the user A and the user B are set as the payers, the payment processing unit 49 may perform the payment processing of 3000 yen based on the payment information of the user A and perform the payment processing of 5000 yen based on the payment information of the user B.

Fifth Modification

In the above-described example embodiment, the payer is registered in advance as a member, and the registrant information DB 35 stores the payment information. Not limited to this, a user whose payment information is not stored may become a payer. In this case, a self-checkout machine capable of communicating with the management server 1 is provided in the store 5, and the payer pays the price of all the purchasing goods taken by the users belonging to the group in cash. Further, the user may transmit the credit card number or other payment information to the management server 1 by a predetermined operation in the portable terminal 2 during shopping. In this case, the payment processing unit 49 performs the payment for all the purchasing goods taken by the users belonging to the group using the received payment information.

Sixth Modification

In the above-described example embodiment, when all the users belonging to the group left the store, the total amount of all the purchasing goods taken by the users belonging to the group is paid collectively. However, the timing of the payment is not limited to this. The payment processing unit 49 may perform the payment of the price of the purchasing goods taken by the companion A when the companion A leaves the store, and may perform the payment the price of the purchasing goods taken by the companion B when the companion B leaves the store. In other words, the payment processing unit 49 may be configured to pay for the purchasing goods taken by the user who has left the store, based on the payment information of the payer, each time the user leaves the store.

Seventh Modification

In the above-described example embodiment, when all the users belonging to the group left the store, the payment processing is performed. In this case, regardless of whether the user who has left the store is the payer or the companion, if even one user who belongs to the group remains in the store 5, the payment processing is not performed and the shopping can be continued. However, not limited this, and the management server 1 may perform the payment processing on the basis of the payment information of the payer after the payer leaves the store. In this case, the companion cannot continue the shopping at the store 5 when the payer leaves the store.

Incidentally, if a flapper gate capable of communicating with the management server 1 is installed at the exit 18, the user may be restricted to leave the store until the payment processing is completed.

Eighth Modification

In the above-described example embodiment, the presentation unit 45 presents the estimation results of the group and the estimation results of the payer together to the user as the group confirmation screen. Not limited to this, the estimation results of the group and the estimation results of the payer may be presented separately to the user. For example, the presentation unit 45 may present the estimation result of the payer to the payer and present the estimation result of the group to a part or all of the users belonging to the group.

Ninth Modification

The purchasing goods lists indicating the purchasing goods taken by each user can be presented at any timing requested by the user. Specifically, the presentation unit 45 transmits the purchasing goods list information to the mobile terminal 2 at a timing when the presentation unit 45 receives the request of the purchasing goods list inputted by a predetermined operation from the mobile terminal 2 used by the user through the communication unit 32. By displaying the purchasing goods list based on the purchasing goods list information received by the portable terminal 2, the user can easily confirm the purchasing goods.

In response to the request of the purchase goods list, the purchase goods list information may be transmitted to the shared terminal. In this case, by displaying the purchasing goods list based on the purchasing goods list information received by the shared terminal, the user who does not have the mobile terminal 2 can easily confirm the purchasing goods.

Tenth Modification

Electronic shelf tags capable of communicating with the management server 1 may be provided on the store shelf 14. In this case, the presentation unit 45 may refer to the purchasing goods list DB 38 at a timing when the user takes out the goods from the store shelf 14 and present the name and the number of the purchasing goods already taken by the user to the electronic shelf tag of the purchasing goods. Also, the presentation unit 45 may present the name and the number of the purchasing goods already taken by, not the user himself or herself, but another user constituting the group to which the user belongs. Further, the presentation unit 45 may present the total amount of all the members of the group, including the goods taken out, such as "the current total amount is 695 yen". By this, the user can conveniently check the purchasing goods already taken by other users belonging to the group and the total amount of all the members at the timing when the goods are taken.

Second Example Embodiment

Hereinafter, a second example embodiment of this disclosure will be described with reference to the drawings. In the present example embodiment, similarly to the first example embodiment, as an example of a facility, a specific example when the application is applied to a store will be described.

[Configuration of the Facility Management System]

Since the configuration of the facility management system 100*x* according to the present example embodiment is the same as that of the first example embodiment, the description thereof will be omitted for convenience. However, the facility management system 100*x* according to the present example embodiment is provided with a shared terminal that can be used by the user near the exit 18 or in the cart. Further, electronic shelf tags are provided on the store shelf 14. The shared terminals and the electronic shelf tags are connected to the server 1*x* to be able to communicate with each other.

[Configuration]

Figure 14:
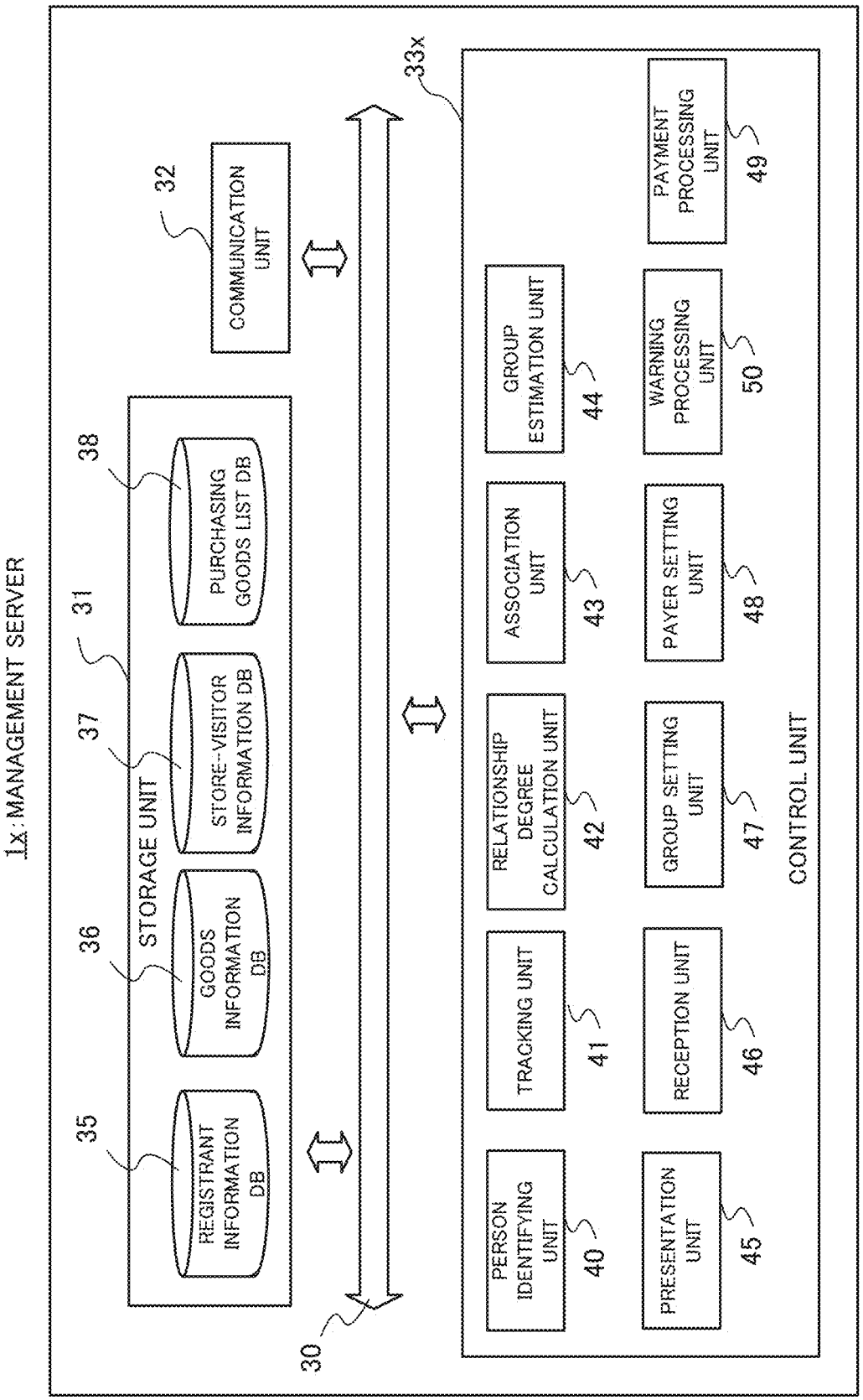
FIG. 14 illustrates a configuration of the facility management system according to a second example embodiment.

Next, the configuration of the management server 1*x* will be described with reference to FIG. 14. FIG. 14 shows a schematic configuration of the management server 1*x*. The management server 1*x* mainly includes a storage unit 31, a communication unit 32 for performing data communication, and a control unit 33*x*. These elements are interconnected by a bus line 30. Incidentally, since the storage unit 31 and the communication unit 32 are the same as those in the first example embodiment, the description thereof will be omitted.

The control unit 33*x* includes a CPU, a ROM, and a RAM which are not shown, and performs various controls for each component in the management server 1*x*. In the present example embodiment, the control unit 33*x* includes a person identifying unit 40, a tracking unit 41, a relationship degree calculation unit 42, an association unit 43, a group estimation unit 44, a presentation unit 45, a reception unit 46, a group setting unit 47, a payer setting unit 48, a payment processing unit 49, and a warning processing unit 50.

Here, description will be given of the warning processing unit 50 which is different from the first example embodiment. The warning processing unit 50 sets a user to which the payment information is not associated as a warning target person, and executes the warning processing for the warning target person. Specifically, when the user is shopping alone or in the group, if the payment information of the user is stored in the storage unit 31, the user is not set as the warning target person. On the other hand, if the user's payment information is not stored in the storage unit 31 when the user enters the store and is shopping alone, the user is set as the warning target person.

Further, when a plurality of users enter the store and are shopping in a group, even if the user's payment information is not stored in the storage unit 31, if a payer is set in the group to which the user belongs, the user does not become the warning target person. On the other hand, when a plurality of users enter the store, if a user does not belong to a group or a payer is not set in the group to which the user belongs, the user is set to be the warning target person. Namely, if the payment information for the price of the purchasing goods taken by the user in the store 5 is unknown, the warning processing unit 50 sets the user as the warning target person and executes the warning processing.

The warning processing will be concretely explained. First, the warning processing unit 50 notifies the warning target person of a message suggesting the registration of the payment information or belonging to the group including a payer. Since the warning target person is an unregistered person whose payment information is not stored, the contact information is unknown. Therefore, the warning processing unit 50 notifies a message stating that "Your payment information is unknown and you do not belong to any group. Register the payment information or belong to a group including a payer" on the shared terminal or the electronic shelf tag provided near the warning target person.

Incidentally, the warning processing unit 50 displays the message on the floor using a spotlight. Further, the warning processing unit 50 may notify the message by screen or voice using a security robot or a drone.

At this time, the user who is a registrant but is set as the warning target person performs operations such as clearly imaging his/her face with the shared terminal. Thus, the management server 1 can identify the user as the registrant based on the face image data of the user with high accuracy.

After setting the warning target person, the warning processing unit 50 presents the face image data of the warning target person to the clerks. Specifically, the warning processing unit 50 transmits the face image data and tracking data of the warning target person to a portable terminal used by the clerk or a shared terminal usable only by the clerks and provided in the backyard. The clerk watches the behavior of the warning target person based on the face image data and the tracking data of the warning target person, and speak to the warning target person, if necessary.

The warning processing unit 50 may also present information about the warning target person to the users in the store 5, if necessary. For example, if a suspicious action of the warning target person intentionally trying to belong to the group of good users is found, the warning processing unit 50 presents a message advising the user to pay attention.

Further, if a flapper gate communicable with the management server 1 is installed at the exit 18, the warning processing unit 50 restricts the exit of the warning target person who has taken the purchasing goods. When the warning target person who has taken the purchasing goods leaves the store 5, the warning processing unit 50 notifies the security room or the police.

Incidentally, when the warning target person does not possess the payment information such as a credit card or a bank account, the warning processing unit 50 may remove the setting of the warning target person and let the warning target person leave the store when the warning target person makes the payment of the purchasing goods by the self-checkout machine. Also, the warning processing unit 50 may guide the payment using the self-checkout machine by signage or the like when the warning target person who does not possess the payment information approaches the exit 18 or the flapper gate.

[Group Payment Processing]

Next, an outline of the group payment processing by the facility management system 100x will be described. The group payment processing is a processing of setting groups and payers for the users who enter the store 5. Further, the group payment processing is a processing of collectively performing the payment for all the purchasing goods taken by the users belonging to the group on the basis of the payment information of the payer. In the group payment processing by the facility management system 100x, a user who is not associated with the payment information is set as the warning target person, and the warning processing is executed.

Figure 15:
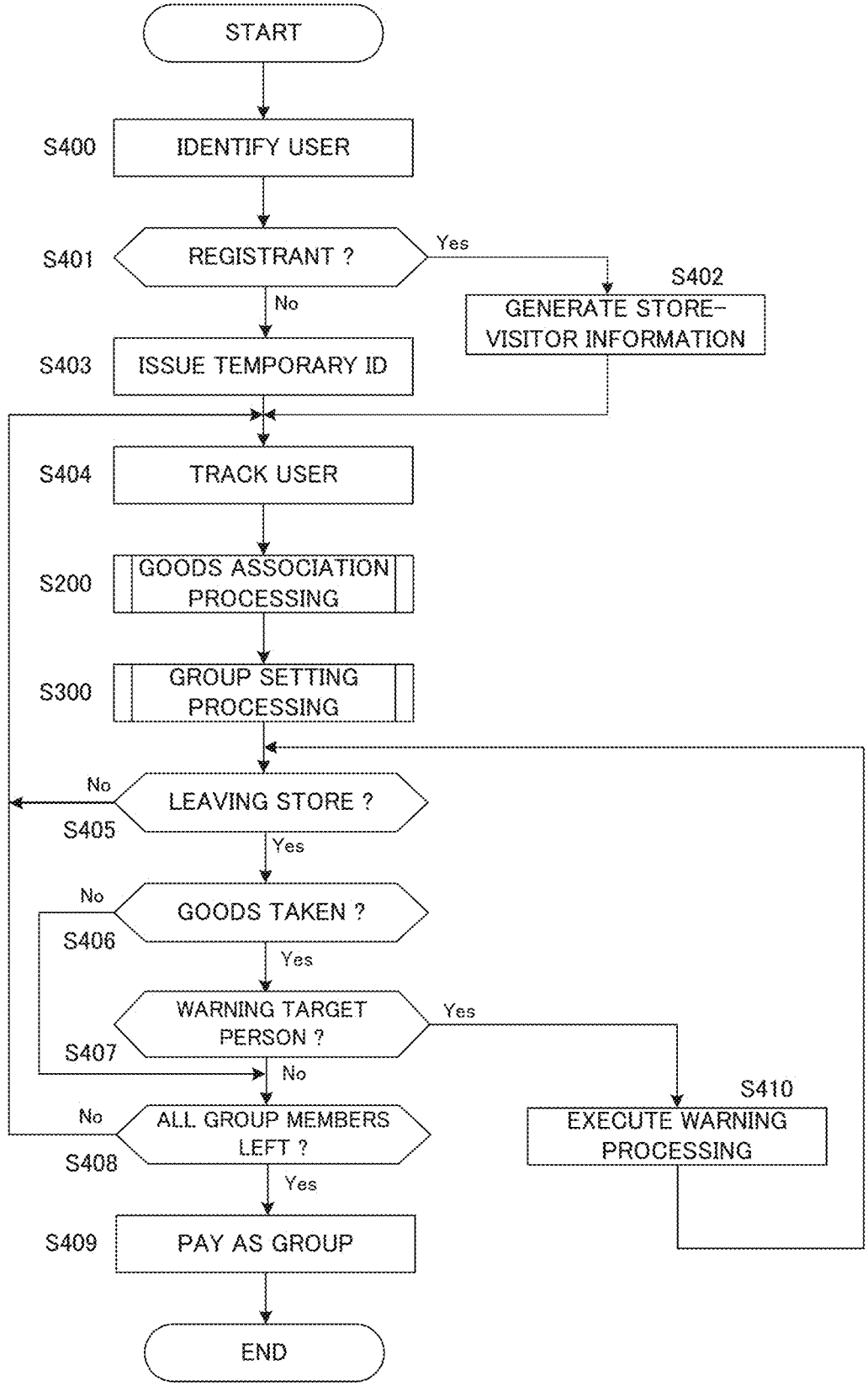
FIG. 15 is a flowchart of a group payment processing according to the second example embodiment.

FIG. 15 is a flowchart showing an outline of the group payment processing according to the second example embodiment. The group payment processing includes a goods association processing S200 and a group setting processing S300. Since the goods association processing S200 and the group setting processing S300 are the same as those of the first example embodiment, the description thereof will be omitted for convenience. Incidentally, the group payment processing is realized mainly by the management server 1 which executes a program prepared in advance.

When the user enters the store 5, the management server 1 identifies the user who entered the store based on the image data acquired from the camera 10 provided near the entrance 16 (step S400). Then, the management server 1 determines whether or not the identified user is a registrant (step S401). When the user is a registrant (step S401; Yes), the management server 1 generates a new store-visitor information including the registration ID and the name read from the registrant information DB 35, the face image data of the user, and the leaving flag (n), and stores the new store-visitor information in the store-visitor information DB 37 (step S402). On the other hand, when the user is not a registrant (step S402; No), the management server 1 issues a temporary ID, generates a new store-visitor information including the temporary ID, the user's face image data, and the leaving flag (n), and stores the new store-visitor information in the store-visitor information DB 37 (step S403).

Then, the management server 1 tracks the movement of each user in the store using the image data of the user acquired from the camera 10 and acquires the movement as the tracking data (step S404). Further, the management server 1 performs the goods association processing (step S200). When the goods association processing is completed, the management server 1 performs the group setting processing (step S300).

When the group setting processing is completed, the management server 1 determines whether or not the user is leaving the store based on the image data acquired from the camera 10 provided near the exit 18 (step S405). If the user is not leaving the store (step S405; No), the management server 1 returns to step S404, and tracks the user, associates the user with the goods, estimates the group, and sets the group at any time according to the behavior of the user in the store 5.

On the other hand, when the user is leaving the store (step S405; Yes), the management server 1 refers to the purchasing goods list DB 38 and determines whether or not the user has taken the purchasing goods (step S406). If the user has not taken the purchasing goods (step S406; No), the management server 1 proceeds to step S408. On the other hand, if the user has taken the purchasing goods (step S406; Yes), the management server 1 refers to the store-visitor information DB 37 and determines whether or not the user is the warning target person (step S407).

If the user is the warning target person (step S407; Yes), the management server 1 performs the warning processing (step S410). For example, the management server 1 notifies the warning target person of a message suggesting the registration of the payment information or belonging to the group including the payer as the warning processing. Also, the management server 1 may present the face image data of the warning target person to the clerks. Further, if the flapper gate is installed at the exit 18, the management server 1 may restrict the exit of the warning target person who has taken the purchasing goods. After the warning processing is executed, the management server 1 returns to step S405.

On the other hand, if the user is not a warning target person (step S407; No), the management server 1 refers to the leaving flag of the store-visitor information DB 37, and determines whether or not all the users belonging to the group have left the store (step S408). When all the users belonging to the group have not left the store, i.e., when one or more users belonging to the group exists in the store 5

(step S408; No), the management server 1 returns to step S404, and performs the tracking of the users, the association of the users with the goods, and the estimation and the setting of the group at any time according to the behavior of the users in the store 5.

On the other hand, when all the users belonging to the group have left the store (step S408; Yes), the management server 1 collectively pays for all the purchasing goods taken by each of the users belonging to the group using the paying information of the payer by referring to the registrant information DB 35 (step S409). Specifically, the payment processing unit 49 authenticates the payer by the biometric authentication, and performs the payment based on the payment information of the authenticated payer. Incidentally, when the user enters the store alone and does not belong to a group, the management server 1 consider that all the members of the group left the store when the user left the store. Thus, the group payment processing according to the second example embodiment ends.

In the above-described group payment processing, the management server 1 executes the warning processing at the timing when the warning target person who has taken the purchasing goods tries to leave the store. Not limited this, the management server 1 can execute the arbitrary warning processing at an arbitrary timing when the warning target person is in the store 5.

As described above, the facility management system 100$x$ of the present example embodiment sets the user who has entered the facility but is not associated with the payment information as the warning target person, and executes the warning processing as necessary. The facility management system 100$x$ assumes an unmanned or labor-saving AI facility, in which the user does not have to register as a member in advance and the user who does not have the payment information can shop in a group. However, on the other hand, there is a high need to prevent illegal action by malicious users. Therefore, executing the warning processing for the user who is set as the warning target person becomes deterrent of illegal actions such as shoplifting or payment by other users, and the crime prevention function may be enhanced.

Third Embodiment

Figure 16:
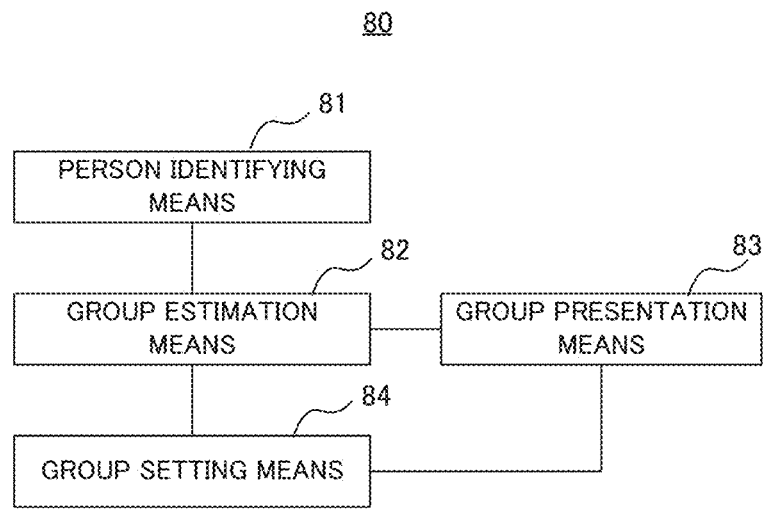
FIG. 16 illustrates a configuration of an information processing apparatus according to a third example embodiment.

FIG. 16 shows a configuration of an information processing apparatus according to a third example embodiment of the disclosure. The information processing apparatus 80 includes a person identifying means 81 configured to identify a person who has entered a facility, a group estimation means 82 configured to estimate a group including a plurality of persons, a group presentation means 83 configured to present an estimation result of the group to the person, and a group setting means 84 configured to set the group based on a response to the estimation result of the group.

Figure 17:
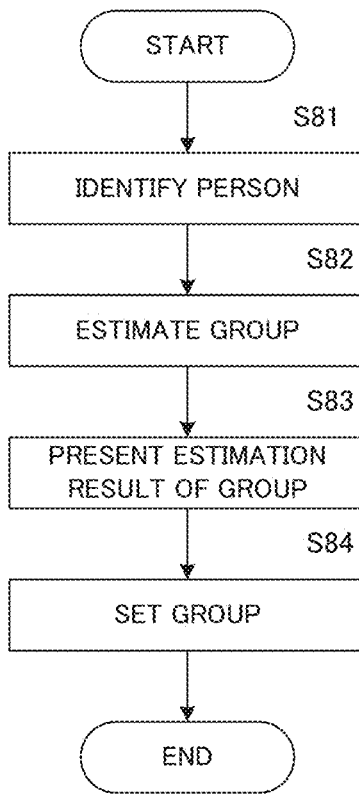
FIG. 17 is a flowchart of processing according to the third example embodiment.

FIG. 17 is a flowchart of the processing by the information processing apparatus 80. The person identifying means 81 identifies a person who has entered a facility (step S81). The group estimation means 82 estimates a group including a plurality of persons (step S82). The group presentation means 83 presents an estimation result of the group to the person (step S83). The group setting means 84 sets the group based on a response to the estimation result of the group (step S84).

According to the third example embodiment, it is possible to set a plurality of persons entering the facility to a group, and to enable management and payment on a group-by-group basis.

Alternatively, some or all of the embodiments described above (including modifications, the same shall apply hereinafter) may be described as the following Supplementary notes, but not limited thereto.

(Supplementary Note 1)

An information processing apparatus comprising:
a person identifying means configured to identify a person who has entered a facility;
a group estimation means configured to estimate a group including a plurality of persons;
a group presentation means configured to present an estimation result of the group to the person; and
a group setting means configured to set the group based on a response to the estimation result of the group.

(Supplementary Note 2)

The information processing apparatus according to Supplementary note 1,
wherein the person identifying means acquires a face image from an image captured by a camera provided inside or outside the facility, and identifies the person based on the face image, and
wherein the group presentation means presents the estimation result including the face image of the person estimated to belong to the group.

(Supplementary Note 3)

The information processing apparatus according to Supplementary note 2, further comprising a relationship degree calculation means configured to calculate a relationship degree between the persons in the facility,
wherein the group estimation means estimates the group based on the relationship degree, and
wherein the relationship degree calculation means calculates the relationship degree based on at least one of a distance between the persons in the image, a direction of a face, opening and closing of a mouth, a physical movement, and presence or absence of sharing of a container for carrying goods.

(Supplementary Note 4)

The information processing apparatus according to Supplementary note 3, further comprising a storage means configured to store an attribute information of the person,
wherein the relationship degree calculation means calculates the relationship degree using the attribute information.

(Supplementary Note 5)

The information processing apparatus according to any one of Supplementary notes 1 to 4, further comprising:
a payer estimation means configured to estimate a payer from among the persons belonging to the group,
a payer presentation means configured to present an estimation result of the payer to the person,
a payer setting means configured to set the payer based on a response to the estimation result of the payer, and
a payment processing means configured to collectively perform payment of all goods that the persons belonging to the group have respectively taken, based on a payment information of the payer.

(Supplementary Note 6)

The information processing apparatus according to Supplementary note 5, wherein the payer estimation means acquires a face image from an image captured by a camera provided inside or outside the facility, and estimates the payer based on at least one of an estimated age of the person included in the image, an order of entering a store, a gender, and presence or absence of a container for carrying goods.

(Supplementary Note 7)

The information processing apparatus according to any one of Supplementary notes 1 to 6, wherein the group estimation means estimates that the persons included in an image captured by a camera provided near an exit of the facility belong to a same group.

(Supplementary Note 8)

The information processing apparatus according to any one of Supplementary notes 5 to 7, wherein the group presentation means presents the estimation result of the group to the payer.

(Supplementary Note 9)

9. The information processing apparatus according to any one of Supplementary notes 1 to 8, wherein the group presentation means presents a list which associates the persons belonging to the group, goods taken by each person, and a total amount of the goods taken by each person with each other, as the estimation result of the group.

(Supplementary Note 10)

The information processing apparatus according to any one of Supplementary notes 5 to 9, further comprising a warning processing means configured to warn the person if the person does not have a payment information and does not belong to a group that includes a payer.

(Supplementary Note 11)

An information processing method comprising:
identifying a person who has entered a facility;
estimating a group including a plurality of persons;
presenting an estimation result of the group to the person; and
setting the group based on a response to the estimation result of the group.

(Supplementary Note 12)

A recording medium recording a program that causes a computer to execute processing comprising:
identifying a person who has entered a facility;
estimating a group including a plurality of persons;
presenting an estimation result of the group to the person; and
setting the group based on a response to the estimation result of the group.

While the present disclosure has been described with reference to the embodiments, the present disclosure is not limited to the above embodiments. Various changes that can be understood by those skilled in the art within the scope of the present disclosure can be made in the configuration and details of the present disclosure. In other words, it is needless to say that the present disclosure includes various modifications and modifications that could be made by a person skilled in the art according to the entire disclosure, including the scope of the claims, and the technical philosophy. In addition, each disclosure of the above-mentioned patent documents, etc. cited shall be incorporated with reference to this document.

DESCRIPTION OF SYMBOLS

1 Management server
2 Portable terminal
3 Network
5 Store
10 Camera
14 Store shelf
16 Entrance
18 Exit
20, 22, 24 User
100 Facility management system

The invention claimed is:

1. An information processing method performed by a computer and comprising:
acquiring images of a person who has entered a facility;
acquiring personal feature information from the images;
identifying the person based on the personal feature information;
determining whether or not payment information is linked to the person;
determining whether or not the person belongs to a group;
setting the person, to whom the payment information is not linked and who does not belong to the group, as a target of warning processing; and
restricting the person set as the target of warning processing from exiting from a store until payment processing has been completed, by communicating with a flapper gate when the payment processing has been completed.

2. The information processing method according to claim 1, wherein the group is a group to which a person whose payment information is registered belongs.

3. The information processing method according to claim 1, wherein the person is set as the target of warning processing, when the person belongs to the group but the payment information is not registered for any one of members of the group.

4. The information processing method according to claim 1, further comprising notifying the target of warning processing of a message suggesting registration of the payment information or belonging to the group including a payer.

5. The information processing method according to claim 4, further comprising presenting face image data of the target of warning processing to a clerk of the store.

6. The information processing method according to claim 1, further comprising presenting information about the target of warning processing to persons in the store.

7. A non-transitory computer-readable recording medium recording a program, the program causing a computer to execute processing comprising:
acquiring images of a person who has entered a facility;
acquiring personal feature information from the images;
identifying the person based on the personal feature information;
determining whether or not payment information is linked to the person;
determining whether or not the person belongs to a group;
setting the person, to whom the payment information is not linked and who does not belong to the group, as a target of warning processing; and
restricting the person set as the target of warning processing from exiting from a store until payment processing has been completed, by communicating with a flapper gate when the payment processing has been completed.

8. The recording medium according to claim 7, wherein the group is a group to which a person whose payment information is registered belongs.

9. The recording medium according to claim 7, wherein the person is set as the target of warning processing, when the person belongs to the group but the payment information is not registered for any one of members of the group.

10. The recording medium according to claim 7, further comprising notifying the target of warning processing of a message suggesting registration of the payment information or belonging to the group including a payer.

11. The recording medium according to claim 10, further comprising presenting face image data of the target of warning processing to a clerk of the store.

12. The recording medium according to claim 7, further comprising presenting information about the target of warming processing to persons in the store.

13. An information processing apparatus comprising:
a memory storing instructions; and
a processor configured to execute the instructions to:
acquire images of a person who has entered a facility;
acquire personal feature information from the images;
identify the person based on the personal feature information;
determine whether or not payment information is linked to the person;
determine whether or not the person belongs to a group;
set the person, to whom the payment information is not linked and who does not belong to the group, as a target of warning processing; and
restrict the person set as the target of warning processing from exiting from a store until payment processing has been completed, by communicating with a flapper gate when the payment processing has been completed.

* * * * *